US010921233B2

(12) United States Patent
Rival et al.

(10) Patent No.: US 10,921,233 B2
(45) Date of Patent: Feb. 16, 2021

(54) FLOW CELLS AND METHODS RELATED TO SAME

(71) Applicant: Illumina, Inc., San Diego, CA (US)

(72) Inventors: Arnaud Rival, Saint Nazaire les Eymes (FR); Ali Agah, Menlo Park, CA (US); Tracy H. Fung, San Mateo, CA (US); Dietrich Dehlinger, San Francisco, CA (US); Poorya Sabounchi, Atherton, CA (US); Tarun Khurana, Fremont, CA (US); Craig M. Ciesla, Mountain View, CA (US); M. Shane Bowen, Encinitas, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 16/567,224

(22) Filed: Sep. 11, 2019

(65) Prior Publication Data
US 2020/0088622 A1 Mar. 19, 2020

Related U.S. Application Data

(60) Provisional application No. 62/731,785, filed on Sep. 14, 2018.

(51) Int. Cl.
*G01N 15/14* (2006.01)
(52) U.S. Cl.
CPC ..... *G01N 15/1404* (2013.01); *G01N 15/1429* (2013.01); *G01N 2015/145* (2013.01)
(58) Field of Classification Search
CPC ....... G01N 21/6428; G01N 2015/1006; G01N 2015/149; G01N 15/1434; G01N 15/1459; G01N 15/1404; G01N 15/1436; G01N 2021/6439; G01N 21/05; G01N 27/4145; G01N 2015/0065; G01N 21/6454; G01N 33/5308; G01N 15/14; G01N 15/1429;
(Continued)

(56) References Cited

U.S. PATENT DOCUMENTS 8,432,011 B1   4/2013  Oganesian et al.
8,906,320 B1 * 12/2014 Eltoukhy ........... G01N 21/6486
                                                  422/417
(Continued)

FOREIGN PATENT DOCUMENTS

CN     107430071    12/2017
JP     2017212238   11/2017
KR     20040024704   3/2004

*Primary Examiner* — Michael P Stafira
(74) *Attorney, Agent, or Firm* — Heslin Rothenberg Farley & Mesiti P.C.

(57) ABSTRACT

Flow cells and corresponding methods are provided. The flow cells may include a support frame with top and back sides, and at least one cavity extending from the top side. The flow cells may include at least one light detection device with an active area disposed within the at least one cavity. The flow cells may include a support material disposed within the at least one cavity between the support frame and the periphery of the at least one light detection device coupling them together. The flow cells may include a lid extending over the at least one light detection device and coupled to the support frame about the periphery of the at least one light detection device. The lid and at least a top surface of the at least one light detection device form a flow channel therebetween.

25 Claims, 16 Drawing Sheets

(58) Field of Classification Search
CPC ............ G01N 15/147; G01N 15/1484; G01N 2021/6471; G01N 21/6486; G01N 2458/10; G01N 27/4148; G01N 33/6845; G01N 2015/144; G01N 2015/1486; G01N 2021/6417; G01N 2021/6441; G01N 21/51; G01N 21/645; G01N 21/6458; G01N 2201/08; G01N 27/4146; G01N 33/54373; G01N 33/5438; G01N 15/0205; G01N 15/0227; G01N 15/1456; G01N 15/1463; G01N 1/20; G01N 1/28; G01N 1/38; G01N 1/40; G01N 1/405; G01N 1/4077; G01N 2015/0053; G01N 2015/0073; G01N 2015/1081; G01N 2015/1415; G01N 2015/1477; G01N 2015/1481; G01N 2015/1493; G01N 2021/0346; G01N 2021/058; G01N 2021/177; G01N 2021/6419; G01N 2021/6421; G01N 2035/00158; G01N 21/31; G01N 21/33; G01N 21/76; G01N 21/763; G01N 2201/06113; G01N 33/493; G01N 33/52; G01N 33/582; G01N 15/00; G01N 15/02; G01N 15/0272; G01N 15/10; G01N 15/1012; G01N 15/1209; G01N 15/1425; G01N 15/1427; G01N 15/1468; G01N 1/14; G01N 1/2035; G01N 2001/386; G01N 2015/0003; G01N 2015/0011; G01N 2015/008; G01N 2015/03; G01N 2015/1062; G01N 2015/1087; G01N 2015/1402; G01N 2015/1406; G01N 2015/142; G01N 2015/1422; G01N 2015/1438; G01N 2015/1445; G01N 2015/145; G01N 2015/1452; G01N 2015/1454; G01N 2015/1461; G01N 2021/0307; G01N 2021/0325; G01N 2021/0375; G01N 2021/174; G01N 2021/1744; G01N 2021/1765; G01N 2021/216; G01N 2021/3595; G01N 2021/4769; G01N 2021/513; G01N 2021/6478; G01N 2021/6482; G01N 2021/6491; G01N 2021/7713; G01N 21/00; G01N 21/01; G01N 21/03; G01N 21/13; G01N 21/17; G01N 21/21; G01N 21/27; G01N 21/3103; G01N 21/314; G01N 21/3151; G01N 21/3577; G01N 21/359; G01N 21/47; G01N 21/4738; G01N 21/53; G01N 21/532; G01N 21/534; G01N 21/64; G01N 21/6402; G01N 21/6456; G01N 21/648; G01N 21/7703; G01N 21/78; G01N 21/8806; G01N 2201/062; G01N 2201/0627; G01N 2201/068; G01N 2201/0873; G01N 2201/12; G01N 2201/1293; G01N 2333/162; G01N 2333/183; G01N 2333/96436; G01N 2469/20; G01N 2500/04; G01N 27/26; G01N 27/302; G01N 27/4141; G01N 27/44782; G01N 27/44791; G01N 29/2406; G01N 33/02; G01N 33/483; G01N 33/4833; G01N 33/4836; G01N 33/48721; G01N 33/48792; G01N 33/49; G01N 33/5005; G01N 33/5008; G01N 33/5047; G01N 33/53; G01N 33/5434; G01N 33/54386; G01N 33/564; G01N 33/56983; G01N 33/56988; G01N 33/6818; G01N 35/00; G01N 35/1097; G01N 37/00; G02B 21/0076; G02B 21/16; G02B 21/367; G02B 2006/12038; G02B 2006/12109; G02B 21/0016; G02B 21/0032; G02B 21/0036; G02B 21/0044; G02B 21/04; G02B 21/18; G02B 21/241; G02B 21/244; G02B 27/0075; G02B 5/04; G02B 5/189; G02B 5/20; G02B 6/02123; G02B 6/12002; G02B 6/12004; G02B 6/124; G02B 6/136; G01J 3/44; G01J 3/42

See application file for complete search history.

(56) References Cited

U.S. PATENT DOCUMENTS

| | | | |
|---|---|---|---|
| 9,387,476 B2* | 7/2016 | Eltoukhy | C12Q 1/6869 |
| 2012/0020026 A1 | 1/2012 | Oganesian et al. | |
| 2015/0241679 A1 | 8/2015 | Fine et al. | |
| 2015/0266022 A1 | 9/2015 | Eltoukhy et al. | |
| 2016/0356715 A1* | 12/2016 | Zhong | B01L 3/502707 |
| 2017/0001606 A1 | 1/2017 | Sabounchi et al. | |
| 2017/0016060 A1* | 1/2017 | Sabounchi | C12Q 1/6806 |
| 2017/0268982 A1 | 9/2017 | Kousai et al. | |
| 2018/0017495 A1 | 1/2018 | Bremer et al. | |
| 2019/0088463 A1* | 3/2019 | Li | H01L 29/20 |
| 2019/0196108 A1* | 6/2019 | Cai | G02B 6/0026 |
| 2019/0198553 A1* | 6/2019 | Cai | G01J 1/0214 |
| 2019/0212266 A1* | 7/2019 | Baker | G02B 21/367 |
| 2020/0066684 A1* | 2/2020 | Fung | H01L 27/146 |
| 2020/0132605 A1* | 4/2020 | Fung | G01N 21/7703 |
| 2020/0166461 A1* | 5/2020 | Fung | G01N 21/6428 |

* cited by examiner

FLOW CELLS AND METHODS RELATED TO SAME

CROSS-REFERENCE TO RELATED APPLICATIONS

This patent application claims priority to U.S. Provisional Patent Application No. 62/731,785, filed Sep. 14, 2018, and entitled Flow Cells and Methods Related to Same. The entire contents of the aforementioned application is hereby incorporated herein by reference.

BACKGROUND

Various protocols in biological or chemical research involve performing a large number of controlled reactions on local support surfaces or within predefined reaction chambers. The designated reactions may then be observed or detected and subsequent analysis may help identify or reveal properties of substances involved in the reaction. For example, in some multiplex assays, an unknown analyte having an identifiable label (e.g., fluorescent label) may be exposed to thousands of known probes under controlled conditions. Each known probe may be deposited into a corresponding well of a microplate. Observing any chemical reactions that occur between the known probes and the unknown analyte within the wells may help identify or reveal properties of the analyte. Other examples of such protocols include known DNA sequencing processes, such as sequencing-by-synthesis (SBS) or cyclic-array sequencing.

In some conventional fluorescent-detection protocols, an optical system is used to direct an excitation light onto fluorescently-labeled analytes and to also detect the fluorescent signals that may be emitted from the analytes. However, such optical systems can be relatively expensive and involve a relatively large benchtop footprint. For example, such optical systems may include an arrangement of lenses, filters, and light sources.

In other proposed detection systems, the controlled reactions occur on local support surfaces or within predefined reaction chambers of a flow cell that does not involve a large optical assembly to detect the fluorescent emissions. The flow cell includes an electronic solid-state light detector device or imager (e.g., a complementary metal-oxide-semiconductor (CMOS) light detector device or a charged-coupled device (CCD) light detector device) positioned adjacent (e.g., beneath) the support surfaces/chambers to detect light emissions from the reactions. However, such proposed solid-state imaging systems may have some limitations. For example, flow cells of such systems may be designed as a single use consumable item.

Accordingly, it may be beneficial for the flow cell to be a small and inexpensive device. In a relatively small flow cell, it may be beneficial to utilize as much of the biosensor active area of the light detection device as possible and/or provide as large as a biosensor active area as possible.

Many current flow cell designs do not allow for full utilization of the biosensor active area as a lid portion of the flow cells is coupled to the active area, thereby rendering such area inaccessible to a reagent solution (e.g., a solution with fluorescently-labeled molecules) and/or preventing the area from including reaction sites (e.g., including analytes). Further, the biosensor active area is often provided by a single sensor, and relatively large sensors with relatively large biosensor active areas are costly. Many current flow cell designs also provide for only a limited number of wiring configurations to the light detection devices.

BRIEF DESCRIPTION

In one aspect of the present disclosure, a flow cell is provided. The flow cell includes a support frame comprising a top side, a back side and at least one cavity extending from the top side toward the bottom side. The flow cell also includes at least one light detection device disposed within the at least one cavity comprising an active area and a top surface. The flow cell further includes a support material disposed within the at least one cavity between the support frame and the periphery of the at least one light detection device coupling the support frame and the at least one light detection device together. The flow cell also includes a lid extending over the at least one light detection device and coupled to the top side of the support frame about the periphery of the at least one light detection device. The lid and at least the top surface of the at least one light detection device form a flow channel therebetween.

In some examples, the support frame further comprises at least one electrically conductive via extending from the top side to the bottom side. In some such examples, the at least one light detection device comprises at least one solid-state light detection device including a base wafer portion, a plurality of light sensors, device circuitry electrically coupled to the light sensors to transmit data signals based on photons detected by the light sensors, and a plurality of light guides associated with the plurality of light sensors. In some such examples, the device circuitry of the at least one solid-state light detection device is electrically coupled to the at least one electrically conductive via at the top side of the support frame.

In some examples, the lid is indirectly coupled to the top side of the support frame. In some examples, the at least one cavity comprises a cavity with a plurality of light detection devices disposed therein. In some such examples, the plurality of light detection devices comprises distinct light detection devices that are spaced from each other, and the support material further extends between adjacent light detection devices. In some other such examples, the plurality of light detection devices comprises at least two integral light detection devices, and the support material extends between the support frame and the periphery of the at least two integral light detection devices.

In some examples, the at least one light detection device comprises a plurality of light detection devices. In some such examples, the at least one cavity comprises a plurality of cavities, and each light detection device of the plurality of light detection devices is disposed in a differing cavity of the support frame. In some examples, the at least one light detection device comprises at least one solid-state light detection device including a base wafer portion, a plurality of light sensors, device circuitry electrically coupled to the light sensors to transmit data signals based on photons detected by the light sensors, and a plurality of light guides associated with the plurality of light sensors. In some such examples, the at least one cavity extends through the support frame from the top side to the bottom side, the device circuitry comprises vias extending through the base wafer portion, and the flow cell further comprises electrical contacts that are at least partially disposed along the back side of the support frame and electrically coupled to the vias. In some other such examples, the at least one light detection device further comprises a reaction structure disposed over the plurality of light guides that forms the top surface thereof, and the reaction structure comprises a plurality of nanowells positioned within the active area.

In some examples, the at least one cavity extends only partially through the support frame from the top side toward the bottom side. In some examples, the at least one light detection device comprises at least one complementary metal-oxide semiconductor (CMOS) light sensor.

In some examples, the flow channel extends over the entirety of the active area of the at least one light detection device.

In another aspect of the present disclosure, a method is provided. The method includes attaching a top surface of a support frame and a planar support surface of a substrate, the support frame comprising at least one cavity extending from the top side to a bottom side thereof. The method further includes positioning at least one light detection device within the at least one cavity such that a top side thereof is positioned on the planar support surface of the substrate and an edge portion of the cavity extends between the support frame and the periphery of the at least one light detection device, the at least one light detection device comprising an active area and a top surface. The method also includes filling the edge portion of the cavity with a support material to couple the support frame and the at least one light detection device together. The method further includes detaching the support frame and the substrate. The method also includes attaching a lid to the top side of the support frame about the periphery of the at least one light detection device to form a flow cell, the lid extending over the at least one light detection device and forming a flow channel between the lid and at least the top surface of the at least one light detection device.

In some examples, the at least one light detection device comprises at least one solid-state light detection device including a base wafer portion forming a back side, a plurality of light sensors, device circuitry electrically coupled to the light sensors coupled to transmit data signals based on photons detected by the light sensors, and a plurality of light guides associated with the plurality of light sensors, and the support frame further comprises at least one electrically conductive via extending from the top side to the bottom side, and the method further comprises electrically coupling the device circuitry of the at least one solid-state light detection device to the at least one electrically conductive via at the top side of the support frame.

In some examples, the at least one light detection device comprises at least one solid-state light detection device including a base wafer portion forming a back side, a plurality of light sensors, device circuitry electrically coupled to the light sensors coupled to transmit data signals based on photons detected by the light sensors, and a plurality of light guides associated with the plurality of light sensors, the device circuitry comprises vias extending through the base wafer portion to the back side thereof, and the method further comprises electrically coupling contacts that are at least partially disposed along the back side of the support frame to the vias at the back side of the base wafer portion.

In some examples, the method further comprises forming a reaction structure on the at least one light detection device prior to attaching the lid, the reaction structure forming the top surface of the at least one light detection device and comprising a plurality of nanowells positioned within the active area. In some such examples, detaching the support frame and the substrate exposes a recessed top side of the support material that extends below and between the top side of the support frame and a top portion of the at least one light detection device, the reaction structure extends over the recessed top side of the support material and the top side of the top side of the support frame, and the reaction structure forms a planar top surface from which the plurality of nanowells extend.

In some examples, the method further comprises obtaining the at least one light detection device, and the obtaining the at least one light detection device comprises dicing at least one complementary metal-oxide semiconductor (CMOS) light sensor from a plurality of integral CMOS light sensors.

In some examples, the flow channel extends over the entirety of the active area of the at least one light detection device.

In another aspect of the present disclosure, another method is provided. The method includes depositing a first support material on a bottom portion of at least one cavity of a support frame, the at least one cavity extending only partially through the support frame from a top side thereof toward a bottom side thereof. The method further includes positioning at least one light detection device within the at least one cavity and over the deposited first support material such that an edge portion of the at least one cavity extends between the support frame and the periphery of the at least one light detection device, the at least one light detection device comprising an active area and a top surface. The method also includes filling the edge portion of the cavity with a second support material. The method further includes attaching a lid to the top side of the support frame about the periphery of the at least one light detection device to form a flow cell, the lid extending over the at least one light detection device and forming a flow channel between the lid and at least the top surface of the at least one light detection device.

In some examples, the flow channel extends over the entirety of the active area of the at least one light detection device.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

These and other objects, features and advantages of this disclosure will become apparent from the following detailed description of the various aspects of the disclosure taken in conjunction with the accompanying drawings.

DRAWINGS

These and other features, aspects, and advantages of the present disclosure will become better understood when the following detailed description is read with reference to the accompanying drawings, which are not necessarily drawn to scale and in which like reference numerals represent like aspects throughout the drawings, wherein.

DETAILED DESCRIPTION

Figure 1:
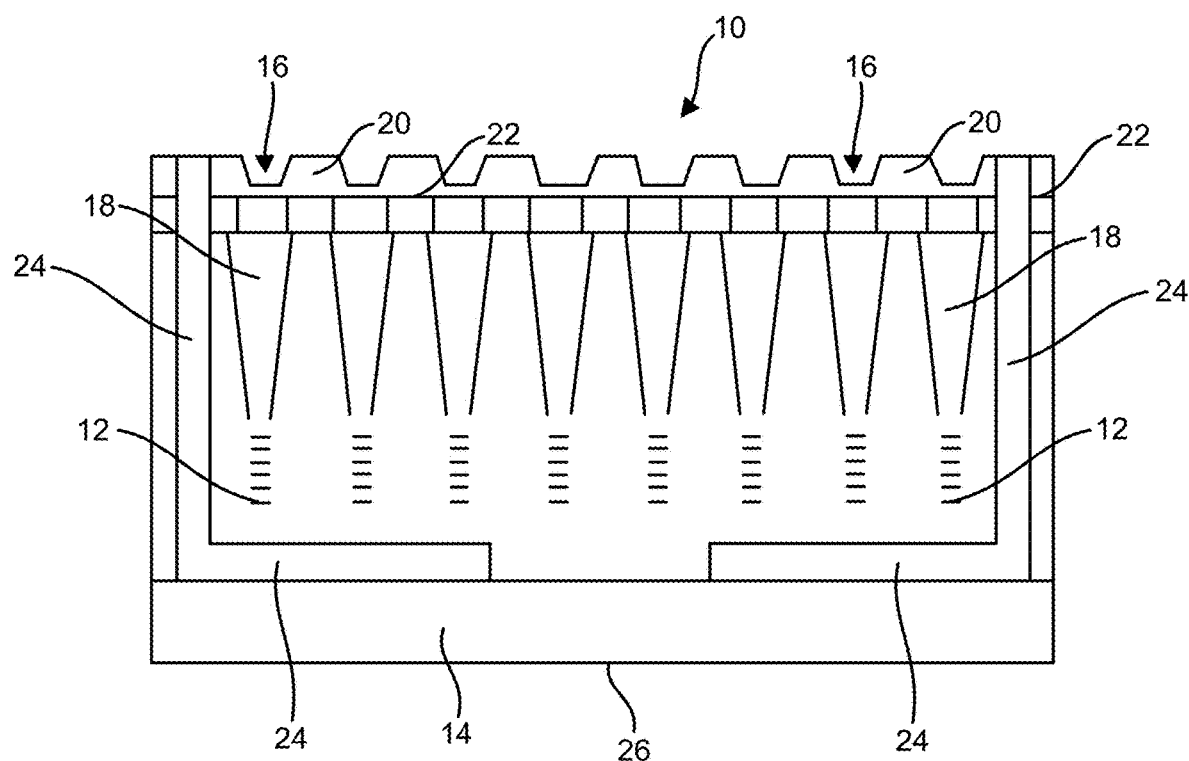
FIG. 1 illustrates, in one example, a cross-section of a light detection device, in accordance with one or more aspects of the present disclosure.

Aspects of the present disclosure and certain examples, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one example" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur— this distinction is captured by the terms "may" and "may be."

As used herein and unless otherwise indicated, the term "entirety" (and any other form of "entire") means at least a substantial portion, such as at least 95% or at least 99%. The term "entirety" (and any other form of "entire"), as used herein, is thereby not limited to 100%, unless otherwise indicated. As used herein, the term "layer" is not limited to a single continuous body of material unless otherwise noted. A "layer" may include multiple sub-layers that may be the same or differing materials, and/or may include coatings, adhesives, and the like. Furthermore, one or more of the layers of the flow cells discoed herein (or sub-layers) may be modified (e.g., etched, deposited with material, etc.) to provide the features described herein.

Flow cells described herein may be used in various biological or chemical processes and systems for academic or commercial analysis. More specifically, the flow cells described herein may be used in various processes and systems where it is desired to detect an event, property, quality, or characteristic that is indicative of a designated reaction. For example, flow cells described herein may include or be integrated with light detection devices, biosensors, and their components, as well as bioassay systems that operate with biosensors.

The flow cells may be configured to facilitate a plurality of designated reactions that may be detected individually or collectively. The flow cells may be configured to perform numerous cycles in which the plurality of designated reactions occurs in parallel. For example, the flow cells may be used to sequence a dense array of DNA features through iterative cycles of enzymatic manipulation and light or image detection/acquisition. As such, the flow cells may be coupled in communication with one or more microfluidic channel that delivers reagents or other reaction components in a reaction solution to a reaction site of the flow cells. The reaction sites may be provided or spaced apart in a predetermined manner, such as in a uniform or repeating pattern. Alternatively, the reaction sites may be randomly distributed. Each of the reaction sites may be associated with one or more light guides and one or more light sensors that detect light from the associated reaction site. In some flow cells, the reaction sites may be located in reaction recesses or chambers, which may at least partially compartmentalize the designated reactions therein.

As used herein, a "designated reaction" includes a change in at least one of a chemical, electrical, physical, or optical property (or quality) of a chemical or biological substance of interest, such as an analyte-of-interest. In particular flow cells, a designated reaction is a positive binding event, such as incorporation of a fluorescently labeled biomolecule with an analyte-of-interest, for example. More generally, a designated reaction may be a chemical transformation, chemical change, or chemical interaction. A designated reaction may also be a change in electrical properties. In particular flow cells, a designated reaction includes the incorporation of a fluorescently-labeled molecule with an analyte. The analyte may be an oligonucleotide and the fluorescently-labeled molecule may be a nucleotide. A designated reaction may be detected when an excitation light is directed toward the oligonucleotide having the labeled nucleotide, and the fluorophore emits a detectable fluorescent signal. In alternative flow cells, the detected fluorescence is a result of chemiluminescence or bioluminescence. A designated reaction may also increase fluorescence (or Førster) resonance energy transfer (FRET), for example, by bringing a donor fluorophore in proximity to an acceptor fluorophore, decrease FRET by separating donor and acceptor fluorophores, increase fluorescence by separating a quencher from a fluorophore, or decrease fluorescence by co-locating a quencher and fluorophore.

As used herein, a "reaction solution," "reaction component" or "reactant" includes any substance that may be used to obtain at least one designated reaction. For example, potential reaction components include reagents, enzymes, samples, other biomolecules, and buffer solutions, for example. The reaction components may be delivered to a reaction site in the flow cells disclosed herein in a solution and/or immobilized at a reaction site. The reaction components may interact directly or indirectly with another substance, such as an analyte-of-interest immobilized at a reaction site of the flow cell.

As used herein, the term "reaction site" is a localized region where at least one designated reaction may occur. A reaction site may include support surfaces of a reaction structure or substrate where a substance may be immobilized thereon. For example, a reaction site may include a surface of a reaction structure (which may be positioned in a channel of a flow cell) that has a reaction component thereon, such as a colony of nucleic acids thereon. In some flow cells, the nucleic acids in the colony have the same sequence, being for example, clonal copies of a single stranded or double stranded template. However, in some flow cells a reaction site may contain only a single nucleic acid molecule, for example, in a single stranded or double stranded form.

A plurality of reaction sites may be randomly distributed along the reaction structure of the flow cells, or may be arranged in a predetermined manner (e.g., side-by-side in a matrix, such as in microarrays). A reaction site can also include a reaction chamber or recess that at least partially defines a spatial region or volume configured to compartmentalize the designated reaction. As used herein, the term "reaction chamber" or "reaction recess" includes a defined spatial region of the support structure (which is often in fluid communication with a flow channel). A reaction recess may be at least partially separated from the surrounding environment or other spatial regions. For example, a plurality of reaction recesses may be separated from each other by shared walls. As a more specific example, the reaction recesses may be nanowells formed by an indent, pit, well, groove, cavity or depression defined by interior surfaces of a detection surface and have an opening or aperture (i.e., be open-sided) so that the nanowells can be in fluid communication with a flow channel.

In some flow cells, the reaction recesses of the reaction structure of the flow cells are sized and shaped relative to solids (including semi-solids) so that the solids may be inserted, fully or partially, therein. For example, the reaction recesses may be sized and shaped to accommodate a capture bead. The capture bead may have clonally amplified DNA or other substances thereon. Alternatively, the reaction recesses may be sized and shaped to receive an approximate number of beads or solid substrates. As another example, the reaction recesses may be filled with a porous gel or substance that is configured to control diffusion or filter fluids that may flow into the reaction recesses.

Light sensors (e.g., photodiodes) of one or more light detection device of the flow cells may be associated with corresponding reaction sites. A light sensor that is associated with a reaction site detects light emissions from the associated reaction site via at least one light guide when a designated reaction has occurred at the associated reaction site. In some flow cells, a plurality of light sensors (e.g., several pixels of a light detection or camera device) may be associated with a single reaction site. In other flow cells, a single light sensor (e.g. a single pixel) may be associated with a single reaction site or with a group of reaction sites. The light sensor, the reaction site, and other features of the flow cells may be configured so that at least some of the light is directly detected by the light sensor without being reflected.

As used herein, a "biological or chemical substance" includes biomolecules, samples-of-interest, analytes-of-interest, and other chemical compound(s). A biological or chemical substance may be used to detect, identify, or analyze other chemical compound(s), or function as intermediaries to study or analyze other chemical compound(s). In particular flow cells, the biological or chemical substances include a biomolecule. As used herein, a "biomolecule" includes at least one of a biopolymer, nucleoside, nucleic acid, polynucleotide, oligonucleotide, protein, enzyme, polypeptide, antibody, antigen, ligand, receptor, polysaccharide, carbohydrate, polyphosphate, cell, tissue, organism, or fragment thereof or any other biologically active chemical compound(s) such as analogs or mimetics of the aforementioned species. In a further example, a biological or chemical substance or a biomolecule includes an enzyme or reagent used in a coupled reaction to detect the product of another reaction such as an enzyme or reagent, such as an enzyme or reagent used to detect pyrophosphate in a pyrosequencing reaction.

Biomolecules, samples, and biological or chemical substances may be naturally occurring or synthetic and may be suspended in a solution or mixture within a reaction recess or region. Biomolecules, samples, and biological or chemical substances may also be bound to a solid phase or gel material. Biomolecules, samples, and biological or chemical substances may also include a pharmaceutical composition. In some cases, biomolecules, samples, and biological or chemical substances of interest may be referred to as targets, probes, or analytes.

As used herein, a "flow cell" includes a device that includes a lid extending over a reaction structure that cooperatively form a flow channel therebetween that is in communication with a plurality of reaction sites of the reaction structure, and includes at least one light detection device that is configured to detect designated reactions that occur at or proximate to the reaction sites. A flow cell may include a solid-state light detection or "imaging" device (e.g., CCD or CMOS light detection device). As one specific example, a flow cell may be configured to fluidically and electrically couple to a cartridge with an integrated pump, which may be configured to fluidically and/or electrically couple to a bioassay system. A cartridge and/or bioassay system may deliver a reaction solution to reaction sites of a flow cell according to a predetermined protocol (e.g., sequencing-by-synthesis), and perform a plurality of imaging events. For example, a cartridge and/or bioassay system may direct one or more reaction solutions through the flow channel of the flow cell, and thereby along the reaction sites. At least one of the reaction solutions may include four types of nucleotides having the same or different fluorescent labels. The nucleotides may bind to the reaction sites of the flow cell, such as to corresponding oligonucleotides at the reaction sites. The cartridge and/or bioassay system may then illuminate the reaction sites using an excitation light source (e.g., solid-state light sources, such as light-emitting diodes (LEDs)). The excitation light may have a predetermined wavelength or wavelengths, including a range of wavelengths. The fluorescent labels excited by the incident excitation light may provide emission signals (e.g., light of a wavelength or wavelengths that differ from the excitation light and, potentially, each other) that may be detected by the light sensors of the flow cell.

As used herein, the term "immobilized," when used with respect to a biomolecule or biological or chemical substance, includes substantially attaching the biomolecule or biological or chemical substance at a molecular level to a surface, such as to a detection surface of a reaction structure over the light detection device of the flow cell. For example, a biomolecule or biological or chemical substance may be immobilized to a detection surface of the reaction structure of the flow cell using adsorption techniques including non-covalent interactions (e.g., electrostatic forces, van der Waals, and dehydration of hydrophobic interfaces) and covalent binding techniques where functional groups or linkers facilitate attaching the biomolecules to the detection surface. Immobilizing biomolecules or biological or chemical substances to the detection surface of the reaction structure of the flow cell may be based upon the properties of the surface, the liquid medium carrying the biomolecule or biological or chemical substance, and the properties of the biomolecules or biological or chemical substances themselves. In some cases, the detection surface may be functionalized (e.g., chemically or physically modified) to facilitate immobilizing the biomolecules (or biological or chemical substances) thereto.

In some examples, nucleic acids can be immobilized to the reaction structure of the flow cell, such as to surfaces of reaction recesses or nanowells thereof. Natural nucleotides and enzymes that are configured to interact with the natural nucleotides maybe utilized. Natural nucleotides include, for example, ribonucleotides or deoxyribonucleotides. Natural nucleotides can be in the mono-, di-, or tri-phosphate form and can have a base selected from adenine (A), Thymine (T), uracil (U), guanine (G) or cytosine (C). It will be understood, however, that non-natural nucleotides, modified nucleotides or analogs of the aforementioned nucleotides can be utilized.

As noted above, a biomolecule or biological or chemical substance may be immobilized at a reaction site in a nanowell of a reaction structure of the flow cell. Such a biomolecule or biological substance may be physically held or immobilized within the reaction recesses through an interference fit, adhesion, covalent bond, or entrapment. Items or solids may be disposed within the reaction recesses, such as include polymer beads, pellets, agarose gel, powders, quantum dots, or other solids that may be compressed and/or held within the nanowell. In certain implementations, the nanowells may be coated or filled with a hydrogel layer capable of covalently binding DNA oligonucleotides. A nucleic acid superstructure, such as a DNA ball, can be disposed in or at a nanowell, for example, by attachment to an interior surface of the nanowells or by residence in a liquid within the nanowells. A DNA ball or other nucleic acid superstructure can be performed and then disposed in or at a nanowell. Alternatively, a DNA ball can be synthesized in situ at a nanowell. A substance that is immobilized in a nanowell can be in a solid, liquid, or gaseous state.

The disclosed flow cells may be configured for biological or chemical analysis to obtain any information or data that relates thereto. Particular flow cells may comprise part of a nucleic acid sequencing system (or sequencer) configured for various applications, including but not limited to de novo sequencing, resequencing of whole genomes or target genomic regions, and metagenomics. The sequencing system may be configured to perform DNA or RNA analysis. The flow cells may be configured to perform a large number of parallel reactions on the active surface thereof to obtain information relating to the reactions.

The flow cells may include one or more flow channel that directs a solution to or toward reaction sites on the active area/surface of the reaction structure over one or more light detection devices, as explained further below. In use, the flow cells may thereby be in fluid communication with a fluid storage system (not shown) that may store various reaction components or reactants that are used to conduct the designated reactions in the flow cell, for example. The fluid storage system may also store fluids for washing or cleaning the or more flow channel of the flow cell and/or for diluting the reactants. For example, the fluid storage system may include various reservoirs to store samples, reagents, enzymes, other biomolecules, buffer solutions, aqueous, and non-polar solutions, and the like. Furthermore, the fluid storage system may also include waste reservoirs for receiving waste products from the flow cell.

FIG. 1 illustrates one example of a light detection device 10 that may be utilized in the flow cells of the present disclosure. The light detection device 10 may comprise a plurality of stacked layers, such as a base layer or wafer 14 and a plurality of dielectric layers and metal-dielectric layers extending thereover. As shown in FIG. 1, the light detection device 10 includes a sensor array of light sensors 12 and a guide array of light guides 18. The light detection device 10 may also include a reaction structure 20 extending along a top portion 22 of the light detection device 10, including over openings of the light guides 18. The light detection device 10 may be configured such that each light sensor 12 corresponds or aligns with a single light guide 18 and/or a single reaction recess 16 (e.g., nanowell) of a reaction structure 20 positioned over a top surface 22 of the light detection device 10, such that it receives photons only therefrom. However, in other examples, a single light sensor 12 may receive photons through more than one light guide 18 and/or from more than one reaction recess 16. A single light sensor 12 may thereby form one pixel or more than one pixel. As shown in FIG. 1, the reaction recesses 16 may be defined by, for example, an indent or change in depth (or thickness) in the top surface of the reaction structure 20.

As shown in FIG. 1, the array of light guides 18 and reaction recesses 16 of the reaction structure 20 (and potentially light sensors 12) may be provided in a defined repeating pattern such that at least some of the recesses 16 and/or light guides 18 (and potentially light sensors 12) are equally spaced from one another in a defined positional pattern. In other examples, the reaction recesses 16 and/or light guides 18 (and potentially light sensors 12) may be provided in a random pattern, and/or at least some of the reaction recesses 16 and/or light guides 18 (and potentially light sensors 12) may be variably spaced from each other. The interstitial areas between the array of reaction recesses 16 may be substantially flat surfaces. As explained further below, the array of reaction recesses 16 of the reaction structure 20 may have at least one corresponding reaction site provided therein (e.g., immobilized on a surface thereof).

The area of the light detection device 10 which is light sensitive is referred to as the active area of the device 10. The active area of the light detection device 10 thereby includes the area containing the light guides 18, which direct light to the light sensors 12. As noted above, the top surface 22 of the light detection device 10 may include a reaction structure 20 with an array of reaction recesses 16 positioned thereover for containing at least one corresponding reaction site thereon/therein that are available/accessible for reagent delivery and reaction (e.g., responsive to an analyte in a reaction fluid) and illumination during operation of the flow cells. As shown in FIG. 1, the reaction structure 20 may extend over the entirety (e.g., at least 95%, or at least 99%, or 100%) of the active area of the light detection device 10. In such configurations, the top or detector surface of the reaction structure 20 may thereby define the active surface of the light detection device 10 over which a reaction solution may flow and reside and interact with the reaction sites formed on/in the reaction recesses 16. The active surface of the light detection device 10 may comprise the surfaces of the recesses 16 and interstitial areas extending between and about the recesses 16.

The exposed top surfaces of the reaction structure 20 (i.e., the exposed top surfaces of the reaction recesses 16 and/or the interstitial areas extending therebetween and thereabout) may comprise smooth planar/flat surfaces. In particular examples, the exposed top surfaces of the interstitial areas and/or reaction recesses 16 of the exposed top surface of the reaction structure 20 may be smooth planar/flat surfaces that prevent reaction solution or any other biological or chemical substances from being trapped or remaining thereon and/or prevent pad hopping errors. For example, the top exposed surfaces of the reaction structure 20 may include a surface roughness micrometric range, such as a surface roughness of less than or equal to 20 µm, or less than or equal to 1 µm. In some examples, reaction structure 20 may include a surface roughness of less than or equal to 100 nm, or less than or equal to 10 nm.

The reaction structure 20 may comprise one or more layers. In one example, the reaction structure 20 includes a plurality of overlapping layers. The reaction structure 20 may include one or more layers that are configured to allow excitation light signals and/or emitted light signals from the reaction sites in the reaction recesses 16 (after treatment with reaction solution) to pass therethrough, into an opening of one or more corresponding light guide 18, and potentially to one or more corresponding light sensor 12 (depending upon the configuration of the light guides 18, for example). As another example, the reaction structure 20 may include one more layer that prevents crosstalk or "sharing" of emitted light from a particular reaction site in a reaction recess 16 from propagating or passing to a non-corresponding sensor 12. The reaction structure 20 may provide a solid surface that permits chemicals, biomolecules or other analytes-of-interest to be immobilized thereon. For example, each of the reaction sites on the reaction recesses 16 may include a cluster of biomolecules that are immobilized in the exposed outer surface thereof. Thus, the reaction structure 20 may comprise a material that permits the reaction sites to be immobilized to the reaction recesses 16. The reaction structure 20 may be physically or chemically modified to facilitate immobilizing the biomolecules to form the reaction sites and/or to facilitate detection of the light emissions therefrom. Examples of layers which may form the reaction structure 20 include at least one SiN layer and at least one TaO layer. However, the reaction structure 20 may comprise differing layers (e.g., different layers, fewer layers, and/or additional layers) and/or differing materials.

The light guides 18 may comprise a filter material configured to filter the excitation light or a range of wavelengths including that of the excitation light, and permit the light emissions from at least one reaction site of at least one corresponding reaction recess 16 (or a range of wavelengths including that of the light emissions) to propagate therethrough and toward at least one corresponding light sensor 12. The light guides 18 may be, for example, an absorption filter (e.g., an organic absorption filter) such that the filter material absorbs a certain wavelength (or range of wavelengths) and allows at least one predetermined wavelength (or range of wavelengths) to pass therethrough. Each of the light guides 18 of the array may include substantially the same filter material, or differing light guides 18 may include differing filter material. Each light guide 18 may thereby be configured relative to surrounding material of the device 10 (e.g., the dielectric material) to form a light-guiding structure. For example, the light guides 18 may have a refractive index of at least about 2.0. In certain configurations, the light guides 18 may be configured such that the optical density (OD) or absorbance of the excitation light is at least about 4 OD.

As shown in FIG. 1, the light detection device 10 may include circuitry 24 that transmits or conducts signals when light emissions (e.g., photons) are detected by the light sensors 12. As discussed above, the light emissions may be emitted from/by the at least one reaction site associated with a reaction recess 16 of the reaction structure 20, and directed or passed to an associated light sensor 12 by at least one light guide 18. The circuitry 24 may include interconnected conductive elements (e.g., conductors, traces, vias, interconnects, etc.) that are capable of conducting electrical current, such as the transmission of data signals that are based on detected photons. For example, the circuitry 24 may be similar to or include a microcircuit arrangement. The light detection device 10 may comprise at least one integrated circuit having an array of the light sensors 12 electrically coupled to the circuitry 24. The circuitry 24 within the light detection device 10 may be configured for at least one of signal amplification, digitization, storage, and processing. The circuitry 24 may collect (and potentially analyze) the light emissions detected by the sensors 12 and generate data signals for communicating detection data to a bioassay system. The circuitry 24 may also perform additional analog and/or digital signal processing in the light detection device 10.

As shown in FIG. 1, the device circuitry 24 of the light detection device 10 may extend adjacent to, or only potentially partially through, the base portion 14. The base portion 14 may thereby be cavity of an electrically conductive via or other portion of the device circuitry 24 that extends therethrough. The back side 26 of the base portion 14, which may form an exposed back side surface 26 of the light detection device 10, may be cavity of the device circuitry 24. Stated differently, the device circuitry 24 may be positioned fully above the back side 26 of the base portion 14 within the light detection device 10 such that the device circuitry 24 is inaccessible at the back side 26 of the base portion 14 and/or the device 10 itself. However, as shown in FIG. 1, the device circuitry 24 may extend to a top side of the light detection device 10. For example, the device circuitry 24 may extend through the light detection device 10 to, and potentially through, the reaction structure 20. The top side of the light detection device 10, which may be formed by the exposed top surface of the reaction structure 20 (if present), may thereby include the device circuitry 24, as shown in FIG. 1. Stated differently, the device circuitry 24 may be exposed and accessible at a top side of the light detection device 10, which may be a top side surface of the reaction structure 20 (if present), as shown in FIG. 1.

The light detection device may be manufactured using integrated circuit manufacturing processes, such as processes used to manufacture charged-coupled devices circuits (CCD) or complementary-metal-oxide semiconductor (CMOS) devices or circuits. The light detection device may thereby include, for example, one or more semiconductor materials, and may take the form of, for example, a CMOS light detection device (e.g., a CMOS image sensor) or a CCD image sensor, another type of image sensor. In the present example, the light detection device 10 is a CMOS type image sensor as shown in FIG. 1, but other types of sensors may be used. For example, as shown in FIG. 1, the light detection device 10 may be semiconductor based, and comprise a plurality of stacked layers including the device base portion 14, which may be a silicon layer or wafer for example.

When configured as a CMOS-type light detection device 10, the "complementary" aspect refers to the inclusion of both n-type and p-type metal-oxide semiconductor field effect transistors (MOSFETs) in integrated circuits (ICs) fabricated using CMOS technology. Each MOSFET has a metal gate with a gate dielectric, such as an oxide (hence, the "Metal-Oxide" part of the name) and a semiconductor material below the gate (corresponds to "Semiconductor" in the name). When the light detection device 10 is configured as shown in FIG. 1, the light sensors 12 may be electrically coupled to the circuitry 24 through the gates, for example.

As a semiconductor based light detection device 10, at least some of the circuitry 24 may be provided within device or substrate layers, through/into which the lights guides 118 may each extend. Each of the substrate layers may include interconnected conductive elements that forms at least part of the device circuitry 24, with dielectric material surrounding or adjacent to the conductive elements of the circuitry. The conductive elements of the circuitry 24 may thereby be embedded within dielectric material. The lights guides 18 may also extend through the dielectric material and may be spaced from the circuitry. Various metallic elements and/or dielectric materials may be used, such as those suitable for integrated circuit manufacturing (e.g., CMOS manufacturing). For example, the conductive elements/circuitry 24 may be metallic elements, such as W (tungsten) elements, Cu (copper) elements, Al (aluminum) elements, or a combination thereof, but it is understood that other materials and configurations may be used. The dielectric material may be a low-k material and/or a silicon-containing material, such as SiO2, but it is understood that other dielectric materials and configurations may be used.

The light detection device 10 may be an integrated circuit die. For example, the light detection device 10 may be manufactured as part of a large batch of a plurality of light detection devices 10 provided on a single base portion (e.g., a wafer) of electronic-grade silicon (EGS) or other semiconductor (such as GaAs). The plurality of as-manufactured devices are thereby integral and formed/arranged adjacent and positioned very close to each other. The wafer is cut (i.e., diced) into many pieces, each containing at least one distinct light detection device 10. As shown in FIG. 1, a single distinct light detection device 10 may be formed (i.e., diced) from the plurality of integral as-manufactured devices of the wafer. Alternatively, a plurality of integral adjacent light detection devices 10 may be formed (i.e., diced) from the plurality of integral as-manufactured devices of the wafer.

Figure 2:
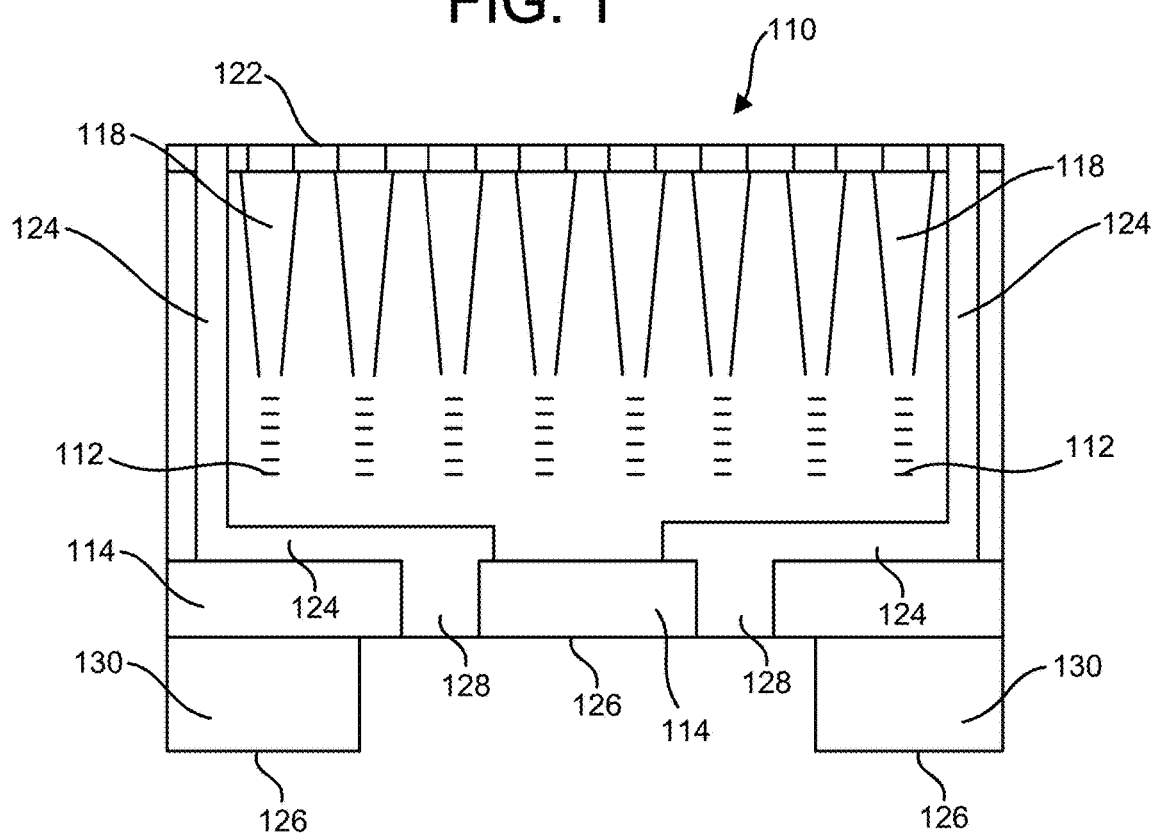
FIG. 2 illustrates, in one example, a cross-section another light detection device, in accordance with one or more aspects of the present disclosure.

FIG. 1 illustrates another example of a light detection device 110 that may be utilized in the flow cells of the present disclosure. Light detection device 110 of FIG. 2 is similar to light detection device 10 of FIG. 1, and therefore like reference numerals preceded with "1" are used to indicate like components, aspects, functions, processes or functions, and the description above directed to thereto equally applies, and is not repeated for brevity and clarity purposes. As shown in FIG. 2, light detection device 110 differs from light detection device 10 in that light detection device 110 does not include a reaction structure (forming reaction recesses and interstitial areas extending therebetween and thereabout) positioned over the top surface 122 thereof. Rather, the as-manufactured or diced light detection device 110 may not include a reaction structure. A reaction structure may be positioned on the top surface 122 of the diced light detection device 110, such as after processing of the light detection device 110 as explained further below.

Light detection device 110 also differs from light detection device 10 in that the circuitry 124 includes vias 128 that extend entirely through the base wafer portion 114, as shown in FIG. 2. The vias 128 are thereby exposed and accessible at the back side 126 of the base wafer portion 114 and the device 110 itself. As also shown in FIG. 2, the back side 126 of the base wafer portion 114 (and the device 110 itself) includes one or more spacer portions 130 extending from the back side 126 of the base wafer portion 114. The at least one spacer portion 130 may be spaced from, positioned adjacent to, or only partially overlap the vias 128 on the back side 126 of the base wafer portion 114. In this way, the at least one spacer portion 130 may be positioned on the back side 126 of the base wafer portion 114 such that at least a portion of each via 128 is exposed and available at the back side 126 of the base wafer portion 114 and the device 110 itself. As shown in FIG. 2, the light detection device 110 may include at least two spacer portions 130 extending along opposing lateral sides of the back side 126 of the base wafer portion 114. The at least one spacer portion 130 may provide structural support or rigidly to the base wafer portions 114, and thereby the device 10 itself (which may have been compromised or weakened by the vias 128). In some light detection devices 110, the at least one spacer portion 130 may be electrically insulative or non-conductive (or a semiconductor) so as to not interfere with the operation of the sensors 112 and/or circuitry 124, for example. Example materials forming the at least one spacer portion 130 include, but are not limited to, glass, fused silica, quartz, silicon, fiberglass, plastic, epoxy, ceramic, a dielectric composite material, paper or a combination thereof.

Figure 3:
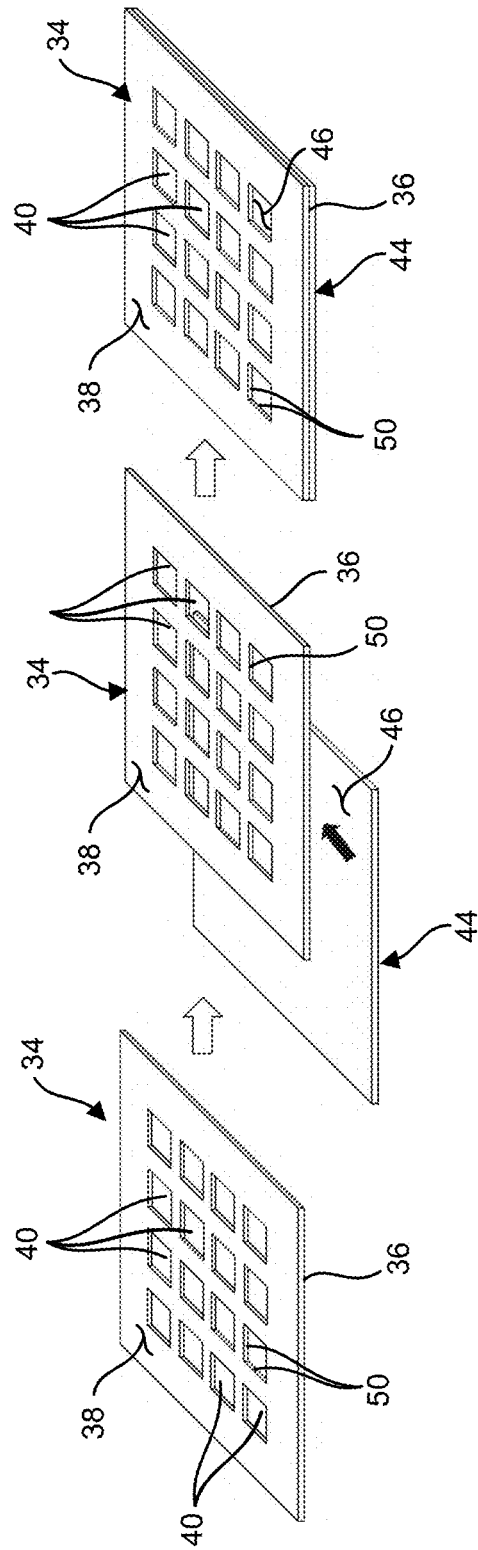
FIG. 3 illustrates, in one example, a support structure comprised of a support frame and a substrate for forming a flow cell, in accordance with one or more aspects of the present disclosure.
Figure 4:
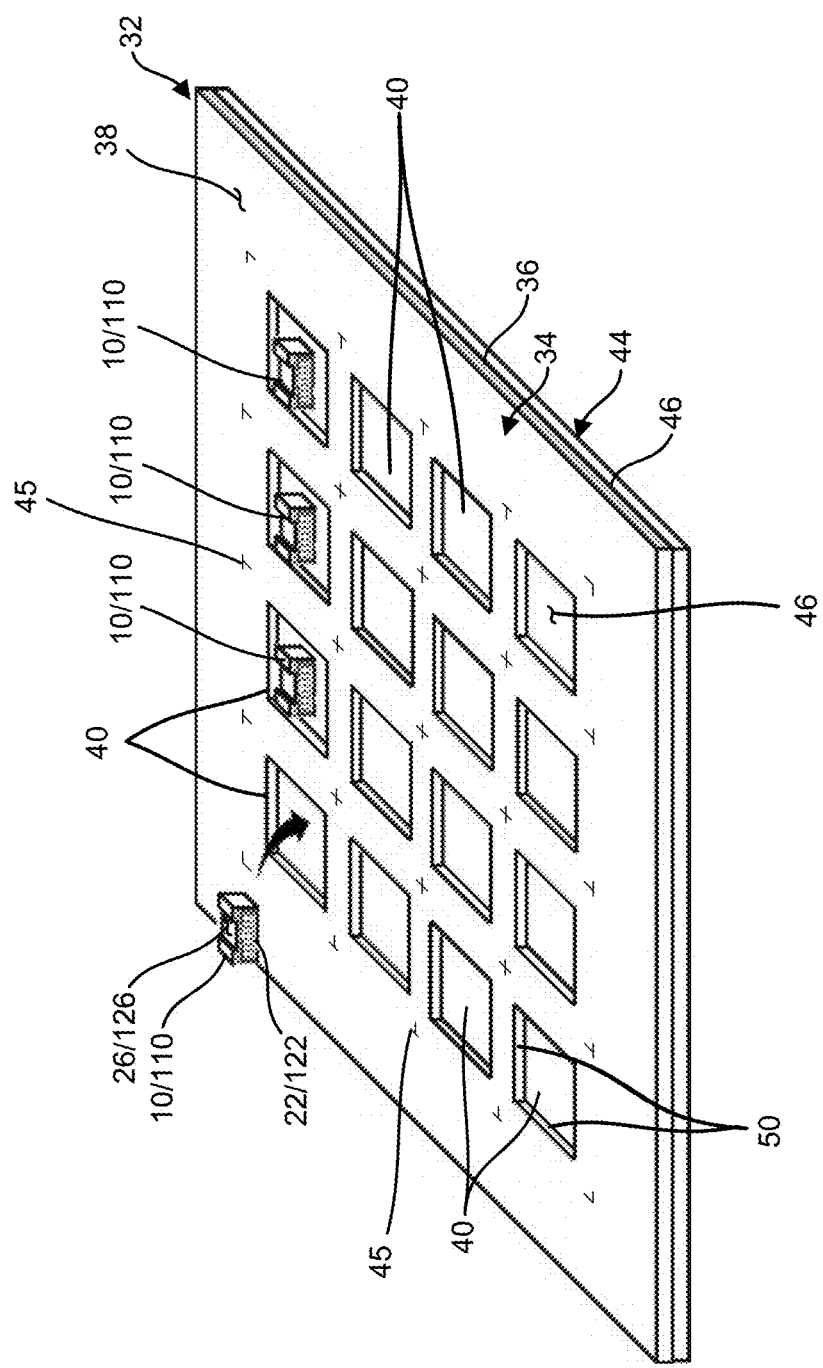
FIG. 4 illustrates, in one example, positioning a light detection device within a cavity of the support structure of FIG. 3, in accordance with one or more aspects of the present disclosure.
Figure 5:
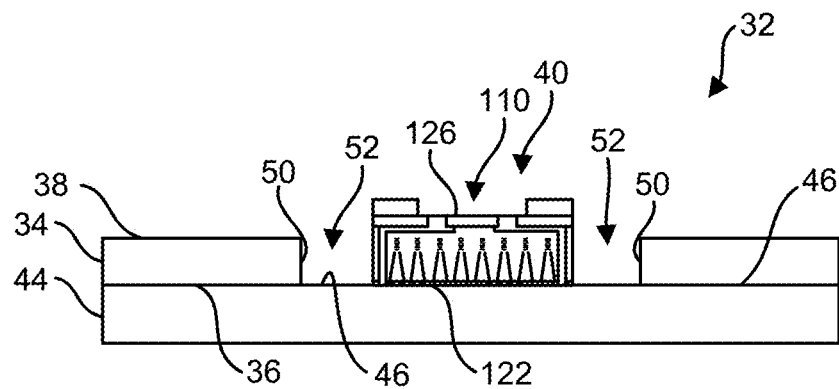
FIG. 5 illustrates, in one example, a cross-section of a light detection device positioned within a cavity of the support structure of FIG. 3, in accordance with one or more aspects of the present disclosure.

As shown in FIGS. 3-5, a support structure 32 including a support frame 34 and a support substrate 44 may be utilized to form a flow cell of the present disclosure. The support frame 34 may define a top surface 36, a bottom surface 38, and at least one cavity 40 (e.g., a void or aperture) extending through the frame 34 between the top and bottom surfaces 36, 38. The support structure 32 may include any number of cavities 44. As shown in FIGS. 3 and 4, the support frame 34 may include an array of a plurality of distinct spaced cavities 40. The array of cavities 40 may be spaced from each other such that a portion of the support frame 34 extends entirely about each cavity 40, and thereby between adjacent cavities 40. The array of cavities 40 may be defined in a repeating (potentially uniform) pattern such that the cavities 40 are evenly or consistently spaced apart. Alternatively, the array of cavities 40 may be randomly distributed such that at least some of the cavities 40 are unevenly spaced apart. As shown in FIG. 5, each cavity 40 may be formed by inner side walls 50 of the support frame 34 that extend between the top and bottom surfaces 36, 38. In some configurations, the inner side walls 50 of the support frame 34 defining the cavities 40 may extend perpendicularly between the top and bottom surfaces 36, 38 such that the size of the cavities 40 may define the same size or shape at the top surface 36 and the bottom surface 38.

Each cavity 40 may be sized and shape to include one or more light detection device, such as the light detection device 110 of FIG. 2 described above as shown in FIGS. 4 and 5. However, as explained further below, one or more light detection devices of a differing configuration may be utilized within the cavities 40 of the support frame 34, such as, but not limited to, light detection device 10 of FIG. 1 described above. Further, at least one light detection device of a first configuration may be utilized with one or more first cavities 40 of the support frame 34, and at least one light detection device of a second configuration may be utilized with one or more second cavities 40 of the support frame 34.

The support frame 34 may substantially planar. For example, the top surface 36 and/or the bottom surface 38 of the support frame 34 may be planar and parallel. In some configurations, the top surface 36 and/or the bottom surface 38 may substantially smooth, such as including a submicron-scale surface roughness. In some configurations, the top surface 36 and/or the bottom surface 38 may include a surface roughness of less than or equal to 50 nm or less than or equal to 10 nm. In some examples, the top surface 36 and/or bottom surface 38 may include a surface roughness of within the range of 1-2 nm. As explained further below, the top surface 36 of the support frame 34 may cooperate with the detector surface of a reaction structure of a light detection device (e.g., the active surface of the device) to form a flow path of the flow cell for the delivery of the reagent solution, or a reaction structure, one or more other layers, and/or a lid may be positioned over the top surface 36 of the support frame 34 and the top portion 122 of the light detection device. As such, the flatness/smoothness of the top surface 36 of the support frame 34 (and the top surface of the reaction structure) may be configured to enable reagent fluidic flow without entrainment or entrapment of the fluid(s).

The support frame 34, and potentially the substrate 44, may be relatively rigid so as to securely hold and couple with the light detection devices 110 within the cavities 40 and prevent damaging distortion/deformation of the light detection devices 110 during manufacturing, handling and/or use of the flow cells of the present disclosure. In some configurations, the support frame 34 (and potentially the substrate 44) includes a young's modulus of at least 50 GPa, or at least 70 GPA. In some configurations, the support frame 34 (and potentially the substrate 44) includes a coefficient of thermal expansion (CTE) of at least about 20 per degree Celsius, or at least about 30 per degree Celsius. For example, the support frame 34 may comprise a boro-aluminosilicate glass (e.g., Corning® Eagle XG® glass) including a young's modulus of within the range of 70-80 GPa and a CTE within the range of 30-35 per degree Celsius, or comprised of silicon including a young's modulus within the range of 160-170 GPa and a CTE within the range of 35-40 per degree Celsius.

The support frame 34 may come into contact with the reagent solution and/or other material/solutions during formation of the reaction sites on the reaction structure positioned over the top portion 122 of the light detection device 110, during illumination/detection and/or preparation and/or cleaning of the flow cells of the present disclosure. The support frame 34 may comprise one or more materials that are unreactive to sequencing reagents, such as a sequencing reagent utilized for DNA grafting, clustering, cleaving, incorporating and/or reading. For example, a sequencing solution may be an aqueous solution and/or may be comprised of an oil.

The support frame 34 may be subject to a chemical mechanical polishing (CMP) process during the formation of one or more flow cells therefrom, as explained further below. The support frame 34 may comprise one or more materials that are unreactive to CMP slurries and mixtures that come into contact with the support frame 34 during the formation of one or more flow cells therefrom. For example, a CMP slurry or mixture may comprise abrasive particles and a base liquid. In some examples, the base liquid may comprise water (e.g., deionized water) and/or an oil. In some examples, the abrasive particles may comprise an oxide, such as silicon dioxide, cerium oxide and/or aluminum oxide, for example.

The support frame 34 may electrically insulate the at least one light detection device 110 positioned within each cavity 40, such as to not interfere with the light sensing operation thereof. At least a portion of the thickness/cross-section of portions of the support frame 34 surrounding/forming the cavities 40 (extending between the top and bottom surfaces 36, 38) may comprise an electrically insulative (i.e., non-conductive) material (or a semiconductor material). For example, at least a portion of the thickness/cross-section of portions of the support frame 34 surrounding/forming the cavities 40 extending from the top surface 36, or a medial portion spaced between the top and bottom surfaces 36, 38, may comprise an electrically insulative (i.e., electrically non-conductive) material (or semiconductor material). In some configurations, the support frame 34 may comprise only the electrically insulative material. Example electrically insulative materials that may form at least a portion of the support frame include silicon, glass (e.g., quartz, fused silica, fiberglass, borosilicate glass (e.g., alkaline earth boro-aluminosilicate glass, such as Corning® Eagle XG® glass), floated borosilicate glass (e.g., Borofloat® 33 glass), or other low autofluorescence glasses), ceramic, polymers (e.g., plastic, epoxy, silicon charged epoxy or UV curable epoxy or adhesives), dielectric composite materials, paper or a combination thereof.

However, as explained further below, portions of the support frame 34 may comprise an electrically conductive material, such as a metal material. For example, as explained further below, the support frame 34 may include electrically conductive vias extending through the thickness/cross-section of portions of the support frame 34 proximate to (e.g., adjacent to) the cavities 40 extending between the top and bottom surfaces 36, 38 (and exposed at the top and bottom surfaces 36, 38). In some configurations, a portion of the thickness/cross-section of portions of the support frame 34 surrounding/forming the cavities 40 extending from the top surface 36 and/or the bottom surface 34 may comprise an electrically conductive material (which may comprise a portion of the vias).

The support frame 34 may include a plurality of visual indications/markings 45, as shown in FIG. 4. The visual indications 45 can be utilized to reference the position and/or orientation of the support frame 34 as a whole and/or portions thereof or components coupled thereto (such as the cavities 40 and one or more light detection device 110 positioned within the cavities 40, as explained further below, for example). In this way, the visual indications 45 can be utilized as alignment marks during processing of the support frame 34 (and components coupled thereto, as explained further below) into one or more intermediate flow cell devices and/or flow cell devices (as explained further below). For example, the visual indications 45 may be utilized for alignment during lidding and/or dicing operations to form one or more intermediate flow cell devices and/or flow cell devices.

The visual indications 45 may comprise any material that visually differs from the support frame 34, such as with respect to a human eye and/or an imaging device (e.g., a digital camera). In some examples, the visual indications 45 may comprise a pigment, paint, dye, luminescent material, metal, oxide or a combination thereof. The visual indications 45 may comprise one or more materials that are unreactive to sequencing reagents and/or CMP slurries.

The visual indications 45 may be provided on the bottom surface 38 (as shown in FIG. 4) of the support frame 34, on the top surface 36 of the support frame 34, embedded at least partially within the thickness of the support frame 34 between the top and bottom surfaces 36, 38 of the support frame 34, or a combination thereof. The visual indications 45 may be formed on the support frame 34 via any process. In some examples, the visual indications 45 may formed on the support frame 34 via a printing process, such as a spraying process or a lithography process.

As shown in FIGS. 4 and 5, the support structure 32 may include the top surface 36 of the support frame 34 coupled to the top surface 46 of the substrate or carrier 44. The support frame 34 and the substrate 44 may be removably coupled or fixedly coupled. In some support structures 32, the substrate 44 may be comprised of the same or similar material as the material of the support frame 34. In some other support structures 32, the substrate 44 may be comprised of a differing material than the material as the support frame 34. The top surface 46 of the substrate 44 may be substantially smooth and planar such that the top surface 36 of the support frame 34 and the top surface 46 of the substrate 44 are parallel, and potentially substantially coplanar as shown in FIG. 5. In some configurations, the top surface 46 of the substrate 44 may define the same or similar surface smoothness as the top surface 36 of the support frame 34.

As also shown in FIGS. 4 and 5, with the top surface 36 of the support frame 34 coupled to the top surface 46 of the substrate 44, the at least one diced light detection device 110 may be positioned within a cavity 40 "facedown" such that the top surface 122 of the at least one light detection device 110 is positioned on or adjacent to the top surface 46 of the substrate 44. In this way, the top surface 122 of the at least one light detection device may be substantially aligned (e.g., co-planar) with the top surface 36 of the support frame 34. Similarly, if the at least one diced light detection device 110 includes a reaction structure provided over the top surface 122 (e.g., as with light detection device 10 of FIG. 1), the top surface of the detector/active surface of the reaction structure may be positioned on or adjacent to the top surface 46 of the substrate 44 and the interstitial portions may be substantially aligned (e.g., co-planar) with the top surface 36 of the support frame 34.

As shown in FIG. 5, the support frame 34 may be thinner than the at least one light detection device 110 such that the back side 126 thereof extends past the bottom surface 38 support frame 34. In some other support frame 34 configurations, the bottom surface 38 support frame 34 may be even with or below the back side 126 of the at least one light detection device 110. The at least one light detection device 110 may define a smaller corresponding size than the cavity 40. The diced at least one light detection device 110 may thereby be positioned within a cavity 40 of the support structure 32 such that the periphery of the at least one light detection device 110 is spaced from the inner side walls 50 of the support frame 34, as shown in FIG. 5. For example, a portion of the cavity 40 may extend about the periphery of the at least one light detection device 110 to form a trench or edge cavity portion 52 that extends between the inner side walls 50 of the cavity 40 of the support frame 34 and the periphery of the at least one light detection device 110.

The at least one light detection device 110 may freely lie directly on the top surface 46 of the substrate 44 in the cavity 40. In some such arrangements, the at least one light detection device 110 may be mechanically held in the cavity 40 via a tool or support member.

Figure 6:
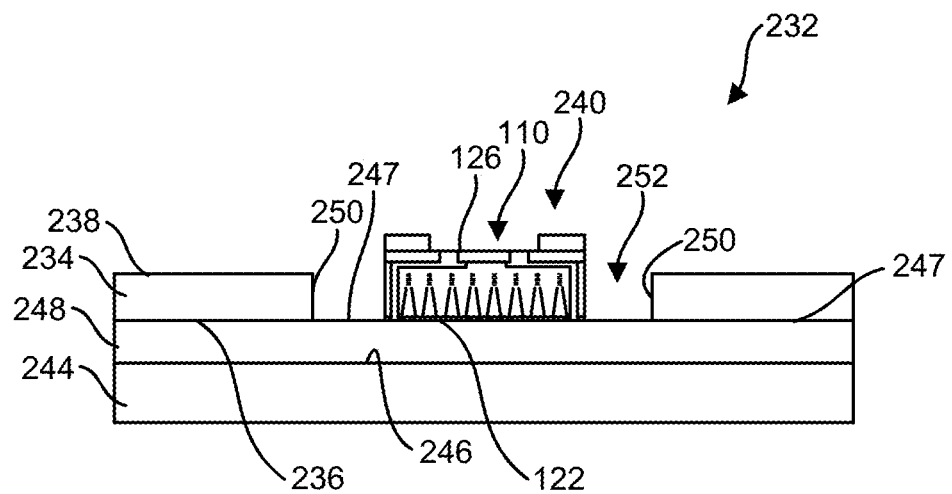
FIG. 6 illustrates, in one example, a cross-section of a light detection device positioned within a cavity of another support structure, in accordance with one or more aspects of the present disclosure.

Another example of a support structure 232 according to the present disclosure is shown in FIG. 6. Support structure 232 of FIG. 6 is similar to support structure 32 of FIGS. 3-5, and therefore like reference numerals preceded with "2" are used to indicate like components, aspects, functions, processes or functions, and the description above directed to thereto equally applies, and is not repeated for brevity and clarity purposes. As shown in FIG. 6, the support structure 232 differs from support structure 32 with the inclusion of an interposer member or layer 248 that chemically couples/bonds the top portion 122 of the at least one light detection device 210 to the top surface 246 of the substrate 244 within the cavity 244. The interposer layer 248 may be any temporary or removable bonding material (e.g., via one or more chemical, mechanical and/or irradiation process). In one example, the interposer layer 248 may comprise a polymer material (e.g., one or more cyclic olefin copolymer), which may be provided within a solvent-cast bonding material composition. For example, the interposer layer 248 may comprise a BrewerBond® temporary bonding material sold by Brewer Science, Inc., such as BrewerBond® 220 or BrewerBond® 305. In another example, the interposer layer 248 may comprise a high UV absorbance release layer and/or an adhesive layer, such as a JSR ELPAC TA series temporary bonding material sold by the JSR Corporation. The interposer layer 248 may be formed by spin coating, spray coating, dye slot coating or lamination, for example, onto the top surface 246 of the substrate 244.

The interposer layer 248 may comprise one or more layers of material that extends over the top surface 246 of the substrate 244 within the cavity 240. The top portion 122 of the at least one light detection device 110 may thereby lie on a top surface 247 of the interposer layer 248 within the cavity 244. The interposer layer 248 may also extend between the top surface 246 of the substrate 244 and the top surface 236 of the support frame 234, as shown in FIG. 6. The top side 236 of the support frame may thereby extend over the top surface 247 of the interposer layer 248, and the interposer layer 248 may extend over the top side 246 of the substrate 244.

Figure 7:
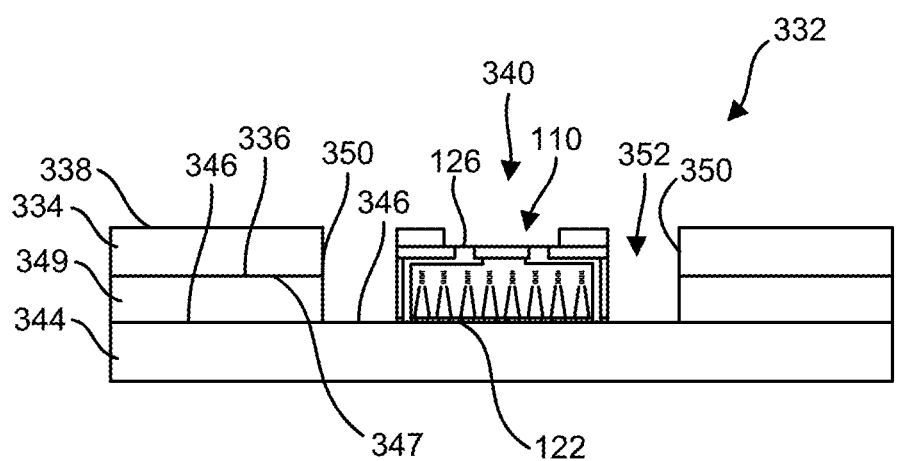
FIG. 7 illustrates, in one example, a cross-section of a light detection device positioned within a cavity of another support structure, in accordance with one or more aspects of the present disclosure.

Another example of a support structure 332 according to the present disclosure is shown in FIG. 7. Support structure 332 of FIG. 7 is similar to support structure 32 of FIGS. 3-5 and support structure 232 of FIG. 6, and therefore like reference numerals preceded with "3" are used to indicate like components, aspects, functions, processes or functions, and the description above directed to thereto equally applies, and is not repeated for brevity and clarity purposes. As shown in FIG. 7, the support structure 332 differs from support structure 32 and support structure 232 with the inclusion of a spacer member/layer 349 that spaces the top surface 346 of the substrate 344 from the top portion 122 of the at least one light detection device 110. The spacer layer 349 may only extend between top surface 346 of the substrate 344 and the top surface 336 of the support frame 334, and thereby not extend through the cavity 340. In this way, the spacer layer 349 raises the top surface 336 of the support frame 334 from the top surface 346 of the substrate 344, on which the top portion 122 of the at least one light detection device 110 overlies. In this way, the spacer layer 349 spaces the top portion 122 of the at least one light detection device 110 past (i.e., above) the top surface 336 of the support frame 334 in a direction extending from the back side 126 to the top portion 122 of the at least one light detection device 110. The spacer layer 349 may comprise the same or similar material as the interposer layer 248. The spacer layer 349 may be formed by spin coating, spray coating, dye slot coating or lamination, for example, onto the top surface 346 of the substrate 344. Although the support structure 332 of FIG. 7 is shown as not including an interposer layer (e.g., the interposer layer 248 of the support structure 232 of FIG. 6), the support structure 332 may include an interposer extending over the top surface 336 of the substrate 344 between the substrate 344 and the support frame 334 and across the cavity 340.

Figure 8:
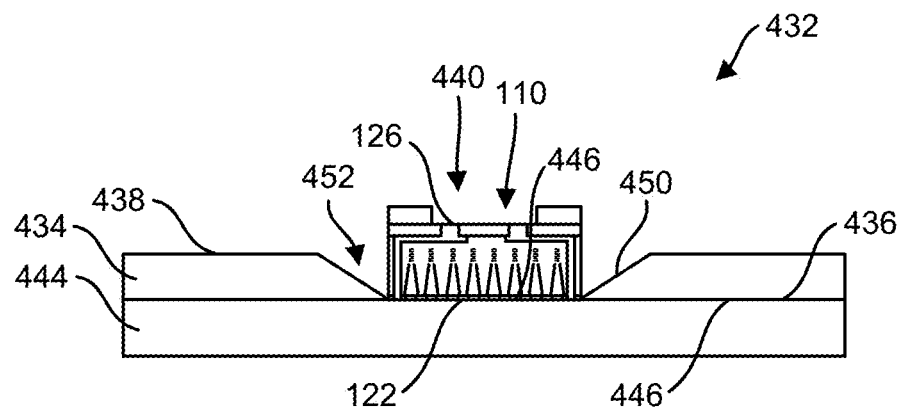
FIG. 8 illustrates, in one example, a cross-section of a light detection device positioned within a cavity of another support structure, in accordance with one or more aspects of the present disclosure.

Another example of a support structure 432 according to the present disclosure is shown in FIG. 8. Support structure 432 of FIG. 8 is similar to support structure 32 of FIGS. 3-5, support structure 232 of FIG. 6 and support structure 332 of FIG. 7, and therefore like reference numerals preceded with "4" are used to indicate like components, aspects, functions, processes or functions, and the description above directed to thereto equally applies, and is not repeated for brevity and clarity purposes. As shown in FIG. 8, the support structure 432 differs from support structure 32, the support structure 232 and the support structure 332 in the configuration of the side walls 450 of the cavities 440.

As shown in FIG. 8, each cavity 440 may be formed by inner side walls 450 of the support frame 434 that extend between the top and bottom surfaces 436, 438. The inner side walls 450 of the support frame 434 defining the cavities 440 may extend inwardly toward the interior of the cavities 440 as they extend from the bottom surface 438 to the top surface 436 such that the size of the cavities 440 is smaller or narrower at the top surface 436 as compared to the bottom surface 438 (i.e., the opening of each cavity 440 at the bottom surface 438 is larger than the opening thereto at the top surface 436). It is noted that the side walls 450 may extend very close to, but still be spaced from, the periphery of the at least one light detection device 110 at the top surface 436. Correspondingly, the edge cavity portion 452 of the cavity 440 that extends between the inner side walls 450 and the periphery of the at least one light detection device 110 may narrow as it extends from the bottom surface 438 to the top surface 436.

The shape or configuration of the inner side walls 450 may be formed by any configuration of the support frame 434 and/or manufacturing or processing technique. For example, the support frame 434 may comprise a plurality of support frame layers with differing sized openings such that when stack together, the openings form the cavities 40. As another example, the shape or configuration of the inner side walls 450 may be formed by etching or otherwise shaping or forming the support frame 434.

In one example, the inner side walls 450 may extend linearly on an angle from the top surface 436 to the bottom surface 434 (i.e., are planar) inwardly toward the interior of the cavities 440, as shown in FIG. 8. In other examples, the inner side walls 450 may not extend linearly (i.e., planar). For example, the inner side walls 450 may extend rectilinearly, curvilinearly or a combination thereof from the bottom surface 438 to the top surface 436 such that the size of the cavities 440 is smaller or narrower at the top surface 436 as compared to the bottom surface 438. In one such example, a portion of the inner side walls 450 of the support frame 434 defining the cavities 440 may extend perpendicularly from the bottom surface 438 toward the top surface 436 along a portion of the thickness of the support frame 534, and another portion may extend linearly at an angle (i.e., angles planes) inwardly toward the interior of the cavities 540 therefrom to the top surface 436.

Figure 9:
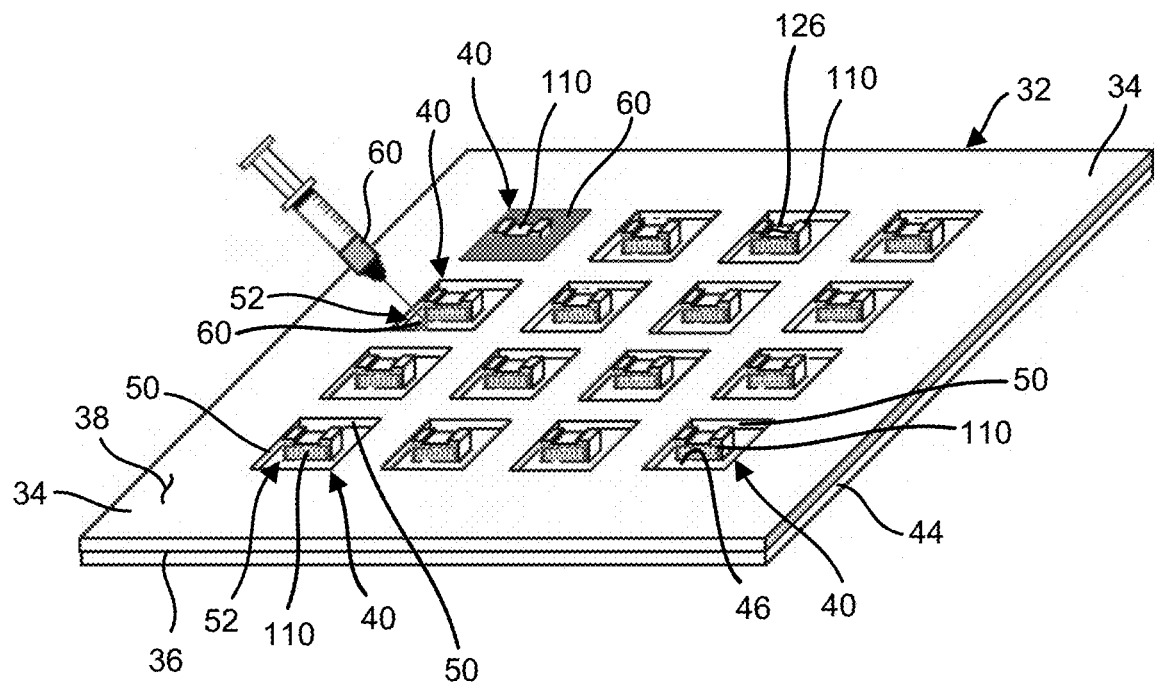
FIG. 9 illustrates, in one example, filling a cavity extending about the periphery of the light detection device positioned within the cavity of the support structure of FIG. 4 with filling material, in accordance with one or more aspects of the present disclosure.
Figure 10:
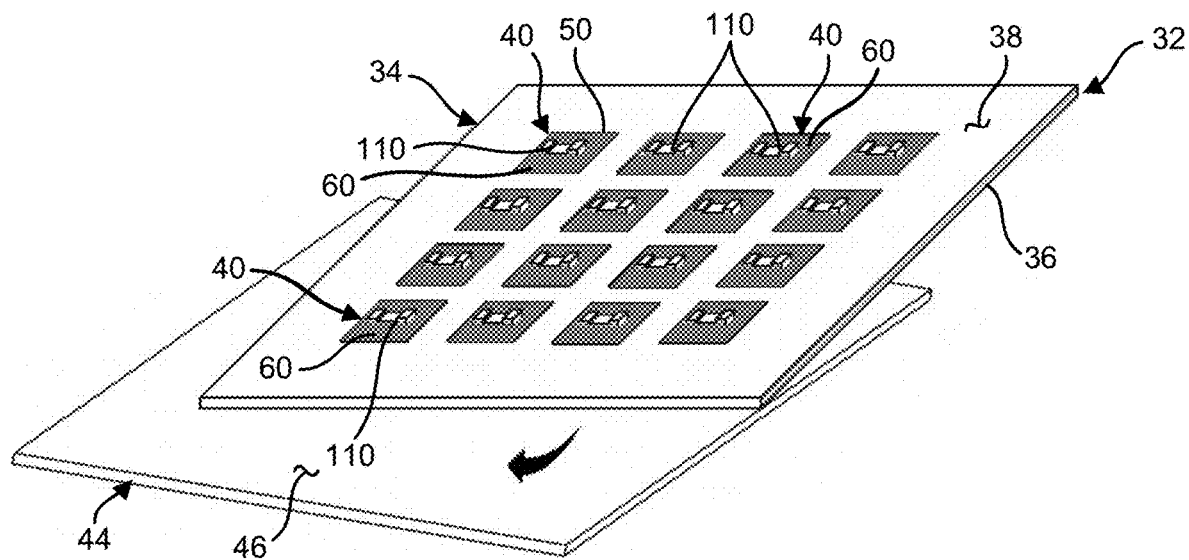
FIG. 10 illustrates, in one example, removal of the substrate from the support frame of the support structure of FIG. 4, in accordance with one or more aspects of the present disclosure.
Figure 11A:
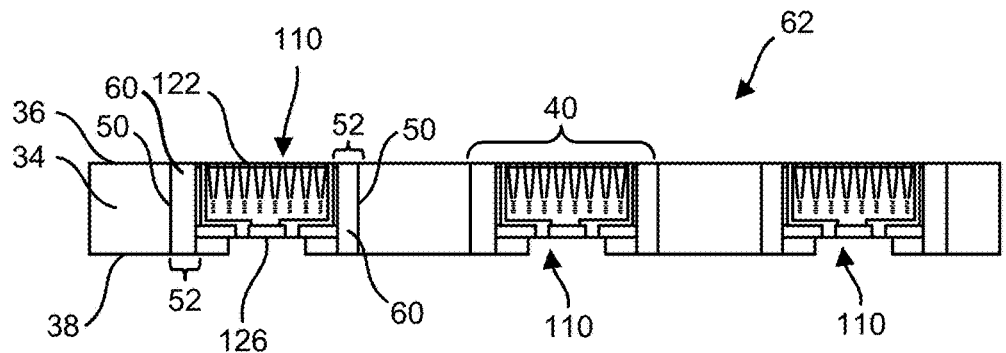
FIG. 11A illustrates, in one example, a cross-section of a plurality of light detection devices coupled within a plurality of cavities of the support frame of FIG. 4 with the substrate removed, in accordance with one or more aspects of the present disclosure.
Figure 11B:
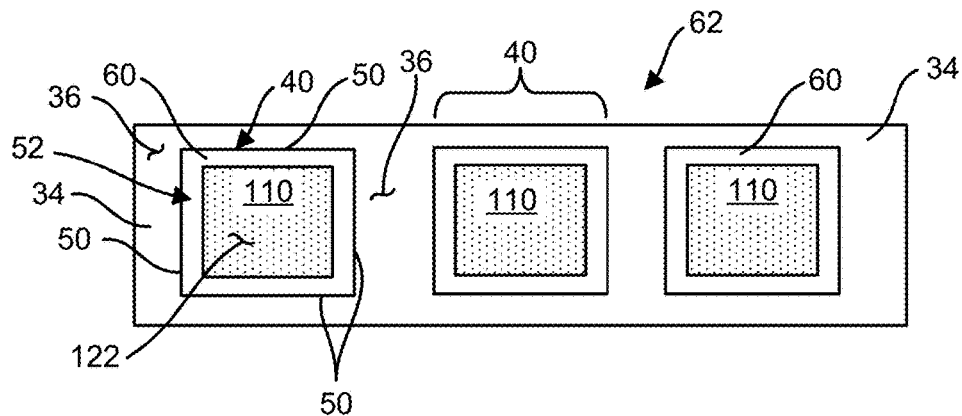
FIG. 11B illustrates, in one example, a top view of the plurality of light detection devices coupled within the cavities support frame of FIG. 11A, in accordance with one or more aspects of the present disclosure.

FIGS. 9-11B illustrates coupling a single distinct light detection device 110 within each cavity 40 of the support frame 34 of the support structure 32 of FIGS. 3-5 via support/filler material 60. As shown in FIG. 9, the support material 60 may be introduced into the edge cavity portion 52 between the side walls 50 of the support frame 34 and the periphery of the light detection device 110 from the exposed side thereof adjacent the bottom surface 38 of the support frame 34. The support material 60 may securely couple the support frame 34 and the light detection device 110 together. Specifically, as shown in FIGS. 11A and 11B, the support material 60 may extend about the periphery of the lateral sides of the of the light detection device 110 positioned within the cavity 40. The support material 60 may thereby extend between, and couple together, the periphery of the lateral sides of the of the light detection device 110 positioned within the cavity 40 and the side walls 50 of the cavity 40. In some examples, after the support material 60 is deposited within each cavity 40, the bottom surface 38 of the support frame 34, the support material 60 and/or the light detection device(s) 110 within each cavity 40 may be subjected to one or more CMP operations. For example, the support material 60 and/or the light detection device(s) 110 within at least one cavity 40 may extend higher than (i.e., above) at least a proximate portion of the bottom surface 38 of the support frame 34, and the one or more CM' operations may remove a portion of the support material 60 and/or the light detection device(s) 110 to planarize the bottom surface 38 of the support frame 34, the support material 60 and the light detection device(s) 110.

The support material 60 may be any material that is able to flow into or otherwise be introduced into the edge cavity portions 52 (such as in a first state, e.g., a liquid or powdered state), and securely couple the support frame 34 and the light detection devices 110 within the cavities 40 together (such as in a second state, e.g., a hardened or cured state). The support material 60 may be electrically insulative or non-conductive (or a semiconductor) so as to not interfere with the operation of the light detection devices 110 (e.g., the operation of the sensors 112 and/or circuitry 124). The support material 60 may come into contact with the reagent solution and/or other material/solutions during formation of the reaction structure, formation of the reaction sites on the reaction structure, illumination/detection and/or preparation and/or cleaning of the flow cells of the present disclosure. As such, the support material 60 may comprise one or more materials that are unreactive to sequencing reagents, such as a sequencing reagent utilized for DNA grafting, clustering, cleaving, incorporating and/or reading. For example, a sequencing reagent may include water and/or an oil. Example materials of the support material 60 include silicon, glass (e.g., quartz, fused silica, fiberglass, borosilicate glass (e.g., alkaline earth boro-aluminosilicate glass, such as Corning® Eagle XG® glass), floated borosilicate glass (e.g., Borofloat® 33 glass), or other low autofluorescence glasses), ceramics, polymers (e.g., plastic, epoxy, silicon charged epoxy or UV curable epoxy or adhesives), dielectric composite materials or a combination thereof.

As shown in FIGS. 10-11B, after the support material 60 fills the edge cavity portion 52 and fixedly couples the support frame 34 and the at least one light detection device 110 with at least one cavity 40, the remainder of the support structure 32 may be removed therefrom. For example, the substrate 44, and any interposer and/or spacer layers/members associated therewith, may be removed from the top surface 36 of the support frame 34, the top portion 122 of the light detection device 110, and a top surface of the support material 60, as shown in FIG. 10. The isolated support frame 34, at least one light detection device 110 positioned within at least one cavity 40, and the deposited support material 60 may comprise an intermediate flow cell device 62, as shown in FIGS. 11A and 11B. The intermediate flow cell device 62 can be further processed into one or more flow cells, as explained further below. As noted above, although the light detection devices 110 of FIG. 2 are illustrated in the array of cavities 40 of the support frame 34 of the intermediate flow cell device 62 of FIGS. 9-11B, light detection devices of other configurations, such as the light detection device 10 of FIG. 1, may similarly or equally be utilized within at least one cavity 40 of the support frame 34.

The mode or method of removal of the intermediate flow cell device 62 from the other portion(s) of the support structure 32 may be related to, at least in part, the material of the support frame 34 and the substrate 44 (and/or any interposer and/or spacer layers/members associated therewith) and/or the mode of attachment of thereof. In some configurations, the intermediate flow cell device 62 may be de-bonded from the remainder of the support structure 32. In some configurations, the substrate 44, and any interposer and/or spacer layers/members associated therewith if present, may be chemically and/or mechanically etched from the intermediate flow cell device 62. In some configurations, the substrate 44, and any interposer and/or spacer layers/members associated therewith if present, may be removed from the intermediate flow cell device 62 via air blowing, blade insertion, vacuum debonding or mechanical lifting with or without pre-processing (such as edge trimming or laser patterning), for example.

As shown in FIGS. 9-11B, in some configurations a single distinct light detection device 110 may be positioned within at least one cavity 40 of the support frame 34. As described above and as shown in FIGS. 9-11B, in such a configuration the support material 60 may be disposed within the edge cavity portion 52 between the side walls 50 of the support frame 34 and the periphery of the single distinct light detection device 110 within a respective cavity 40 to couple the support frame 34 and the single distinct light detection device 110 together.

Figure 12A:
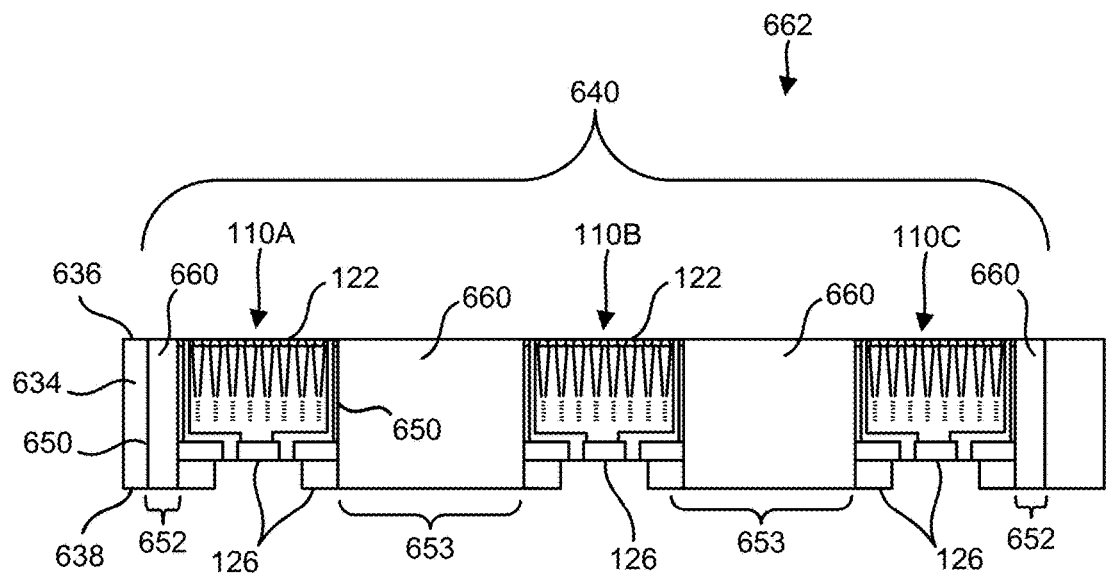
FIG. 12A illustrates, in one example, a cross-section of a plurality of light detection devices coupled within a cavity of a support frame with a substrate removed, in accordance with one or more aspects of the present disclosure.
Figure 12B:
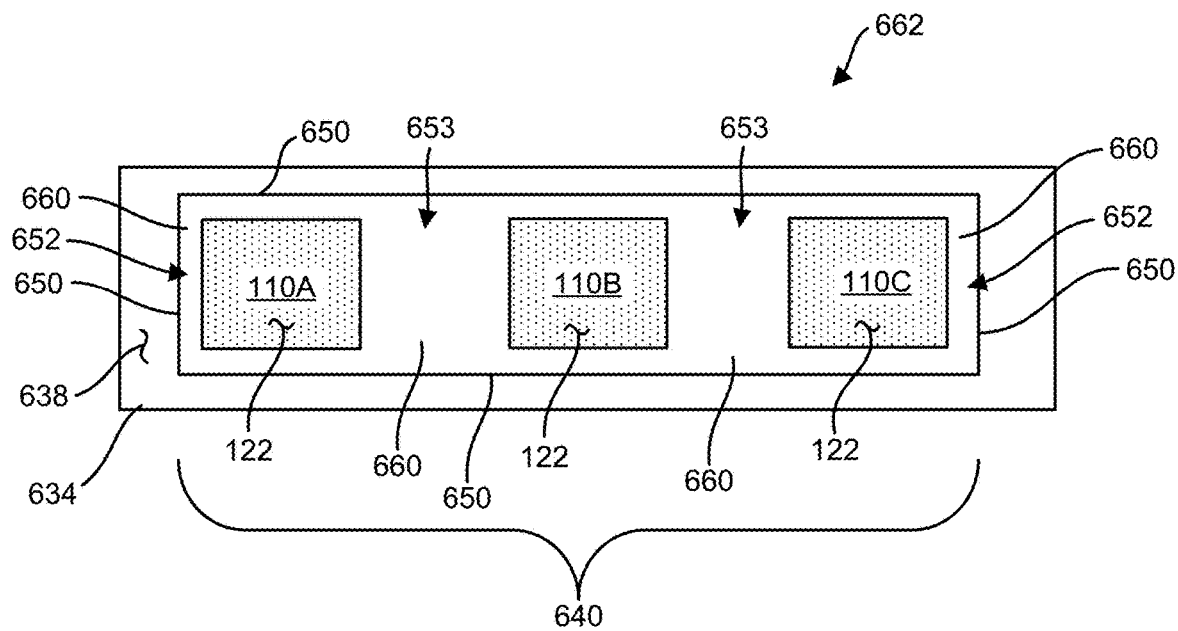
FIG. 12B illustrates, in one example, a top view of the plurality of light detection devices coupled within the cavity of the support frame of FIG. 12A, in accordance with one or more aspects of the present disclosure.

As shown in FIGS. 12A and 12B, in some other intermediate flow cell device 662 configurations a plurality of spaced distinct light detection devices 110A, 110B, 110C may be positioned within at least one cavity 640 of a support frame 634. It is noted that although three light detection devices 110A, 110B, 110C are used herein to illustrate utilization of a plurality of light detection devices, any number of light detection devices may equally be employed (e.g., two light detection devices, three light detection devices, four light detection devices, five light detection devices, etc.). Intermediate flow cell device 662 of FIGS. 12A and 12B is similar to intermediate flow cell device 62 of FIGS. 11A and 11B, and therefore like reference numerals preceded with "6" as opposed to "1" are used to indicate like components, aspects, functions, processes or functions, and the description above directed to thereto equally applies, and is not repeated for brevity and clarity purposes.

As shown in FIGS. 12A and 12B, in such a configuration of the intermediate flow cell device 662 the support material 660 may be disposed within the edge cavity portion 652 between the side walls 650 of the support frame 634 and the peripheral sides of the plurality of spaced distinct light detection devices 110A, 110B, 110C adjacent and/or facing thereto to couple the support frame 634 and the light detection devices 110A, 110B, 110C together. Further, as shown in FIGS. 12A and 12B, the distinct light detection devices 110A, 110B, 110C may be spaced from each other such that an interstitial or inter-device portion 653 of the cavity 640 is positioned between adjacent distinct light detection devices 110A, 110B, 110C. The support material 660 may be disposed within the interstice portion 652 between adjacent distinct light detection devices 110A, 110B, 110C to couple the devices 110A, 110B, 110C together and to the support frame 634. In this way, the support material 660 may extend about the periphery of the spaced distinct light detection devices 110A, 110B, 110C positioned within the cavity 640.

Figure 13A:
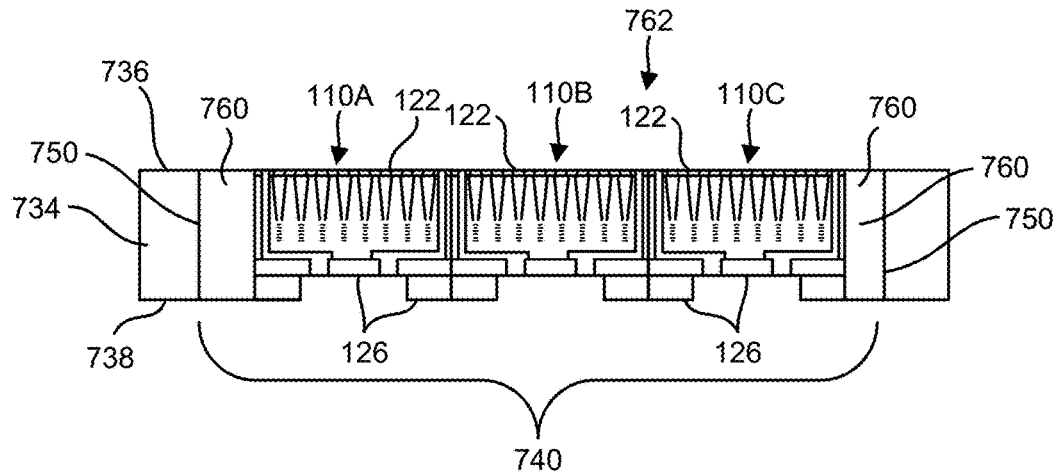
FIG. 13A illustrates, in one example, a cross-section of a plurality of light detection devices coupled within another cavity of a support frame with a substrate removed, in accordance with one or more aspects of the present disclosure.
Figure 13B:
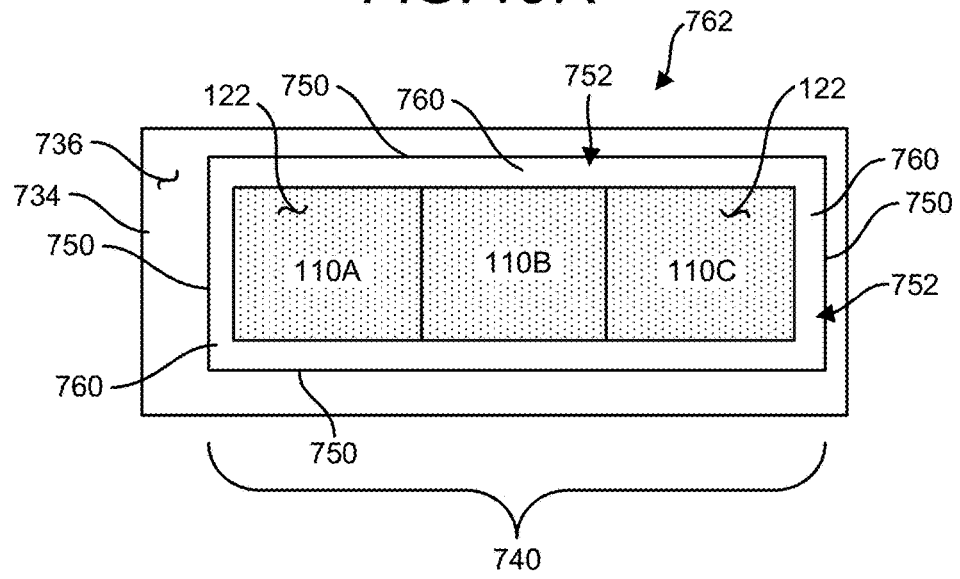
FIG. 13B illustrates, in one example, a top view of the plurality of light detection devices coupled within the cavity of the support frame of FIG. 13A, in accordance with one or more aspects of the present disclosure.

As shown in FIGS. 13A and 13B, in some other intermediate flow cell device 762 configurations a plurality of integral, coupled or non-spaced distinct light detection devices 110A, 110B, 110C may be positioned within at least one cavity 740 of a support frame 734. Intermediate flow cell device 762 of FIGS. 13A and 13B is similar to intermediate flow cell device 62 of FIGS. 11A and 11B and intermediate flow cell device 662 of FIGS. 12A and 12B, and therefore like reference numerals preceded with "7" as opposed to "1" or "6," respectively, are used to indicate like components, aspects, functions, processes or functions, and the description above directed to thereto equally applies, and is not repeated for brevity and clarity purposes.

As shown in FIGS. 13A and 13B, in such a configuration of the intermediate flow cell device 762 the support material 760 may be disposed within the edge cavity portion 752 between the side walls 750 of the support frame 734 and the exposed peripheral sides of the plurality of integral, coupled or non-spaced distinct light detection devices 110A, 110B, 110C adjacent and/or facing thereto to couple the support frame 734 and the light detection devices 110A, 110B, 110C together. As the plurality of light detection devices 110A, 110B, 110C are integral, coupled or non-spaced, the cavity 740 does not extend between adjacent devices 110A, 110B, 110C (and therefore the support material 760 does not extend between adjacent devices 110A, 110B, 110C). As discussed above, the plurality of distinct light detection devices 110A, 110B, 110C may be manufactured as a portion of a wafer of a plurality of integral or coupled distinct light detection devices 110A, 110B, 110C. The wafer of devices may be diced into single distinct light detection devices (as shown in FIGS. 10-12B) and/or a plurality of integral or coupled distinct light detection devices (comprised of any number of individual distinct devices) (as shown in FIGS. 13A and 13B).

Figure 14:
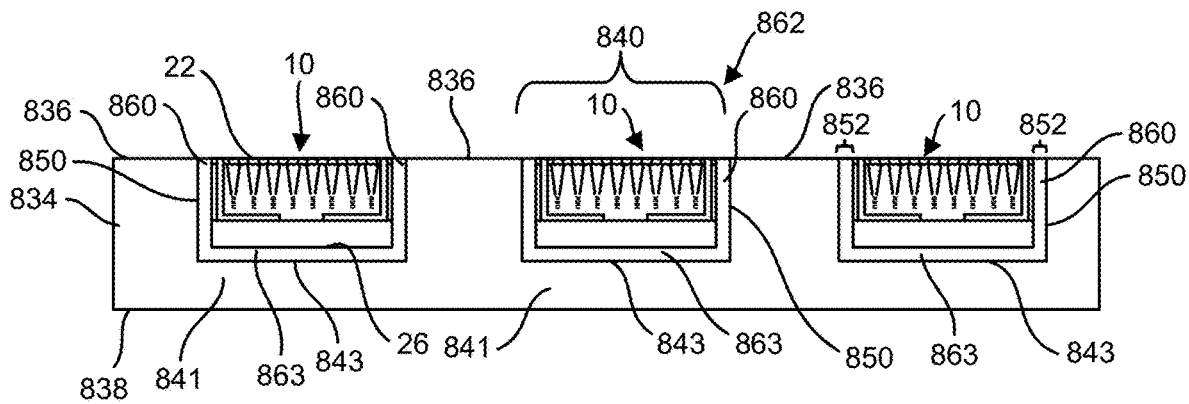
FIG. 14 illustrates, in one example, a cross-section of a plurality of light detection devices coupled within cavities of another support frame in accordance with one or more aspects of the present disclosure.

FIG. 14 illustrates an intermediate flow cell device 862 formed via a frame 834 and at least one light detection device 10 within one or more cavities 840 thereof but without a base substrate or any associated interposer and/or spacer layers. Intermediate flow cell device 862 of FIG. 14 is similar to intermediate flow cell device 62 of FIGS. 11A and 11B, intermediate flow cell device 662 of FIGS. 12A and 12B and intermediate flow cell device 762 of FIGS. 13A and 13B, and therefore like reference numerals preceded with "8" are used to indicate like components, aspects, functions, processes or functions, and the description above directed to thereto equally applies, and is not repeated for brevity and clarity purposes. Although only a single light detection device 110 is illustrated in each cavity 840 in FIGS. 15A and 15B, as discussed above a cavity 840 may include a plurality of spaced light detection devices 110, and the support material 860 may extend between adjacent spaced light detection devices 110. Further, although the light detection devices 10 of the FIG. 1 as shown in each cavity 840, as discussed above other light detection devices 10 may be equally utilized, such as the light detection device 110 of FIG. 2.

Intermediate flow cell device 862 differs from intermediate flow cell device 62, intermediate flow cell device 662 and intermediate flow cell device 762 in the configuration of the cavities 840 of support frame 834 and support material 860. As shown in FIG. 14, the cavities 840 extend only partially through the thickness of the support frame 840. The cavities 840 extend from the top surface 836 and toward the bottom surface 838 of the support frame 840 through a portion of thereof. A bottom portion 841 of the support frame 841 thereby extends between a bottom surface 843 of the cavities 840 and the bottom surface 838 of the support frame 840, as shown in FIG. 14.

As also shown in FIG. 14, a bottom layer or portion 863 of the support material 860 may extend over the bottom surface 843 of the cavities 840, and at least one light detection device 10 may be positioned thereon. In this way, the bottom portion 863 of the support material 860 may extend between the bottom surface 26 of the at least one light detection device 10 and the bottom surface 843 of the respective cavity 840.

In some examples, the support material 860 may initially be provided over the bottom surface 843 of the cavities 840 to form the bottom portion 863 thereof, and at least one light detection device 10 placed thereon such that the bottom portion 863 of the support material 860 couples or otherwise holds the at least one light detection device 10 in place within the respective cavity 840 for further processing. For example, after placement of at least one light detection device 10 over/on the bottom portion 863 of the support material 860 (e.g., the bottom surface 26 of the of at least one light detection device 10 positioned on an exposed top surface of the bottom portion 863 of the support material 860), additional support material 860 may be introduced into the edge cavity portion 852 between the side walls 850 of the support frame 834 and the periphery of the at least one light detection device 10 and over the exposed portions of the (previously-formed) bottom portion 863 of the support material 860. In some other examples, the bottom portion 863 of the support material 860 may not be present, and at least one light detection device 10 may be positioned directly on the bottom surface 838 of the support frame 840 (or another layer or material may be positioned therebetween).

Figure 15A:
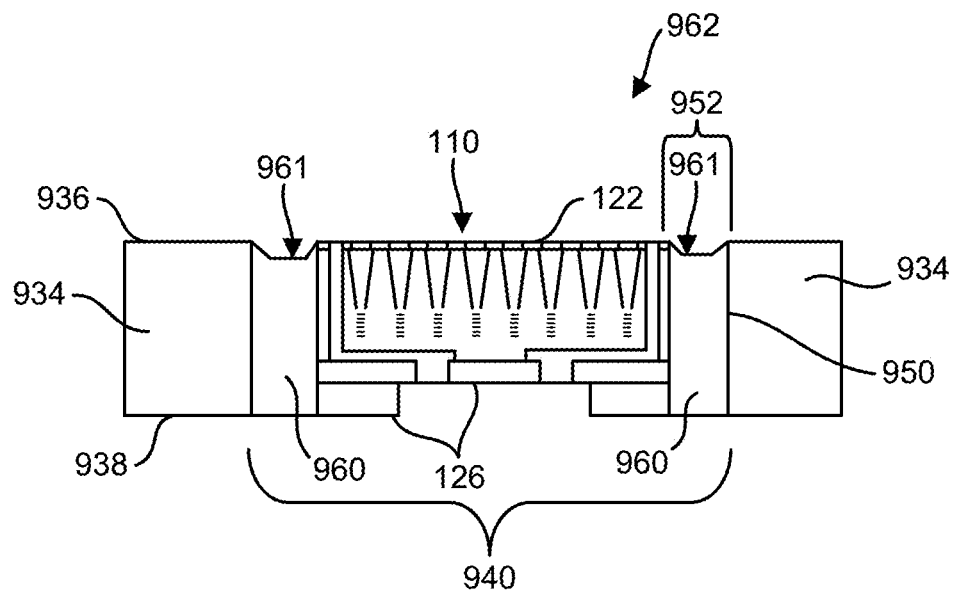
FIG. 15A illustrates, in one example, a cross-section of a light detection device and filling material within a cavity of a support frame, in accordance with one or more aspects of the present disclosure.
Figure 15B:
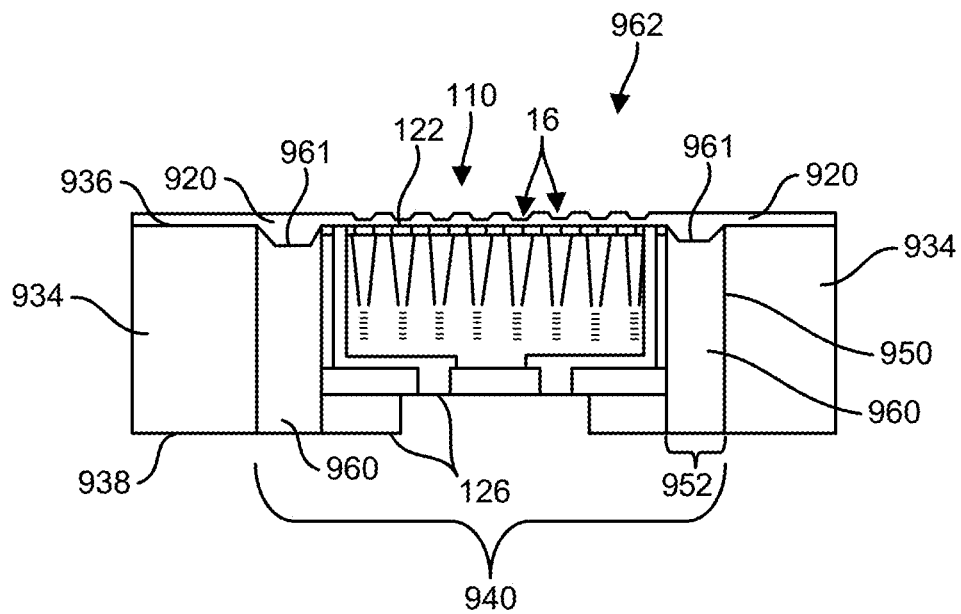
FIG. 15B illustrates, in one example, a cross-section of the light detection device and filling material within the cavity of the support frame of FIG. 15A with a reaction structure positioned thereon, in accordance with one or more aspects of the present disclosure.

As shown in FIGS. 15A and 15B, after formation of an intermediate flow cell device 962, a top surface 961 of the support material 960 within the cavities 940 may be exposed. Intermediate flow cell device 962 of FIGS. 15A and 15B is similar to intermediate flow cell device 62 of FIGS. 11A and 11B, intermediate flow cell device 662 of FIGS. 12A and 12B, intermediate flow cell device 762 of FIGS. 13A and 13B and intermediate flow cell device 862 of FIG. 14, and therefore like reference numerals preceded with "9" are used to indicate like components, aspects, functions, processes or functions, and the description above directed to thereto equally applies, and is not repeated for brevity and clarity purposes. For example, intermediate flow cell device 962 may be formed via removal or separation of a support substrate and any associated interposer and spacer layers from the top surface 936 of the support frame 934, the top surface 961 of the support material 960 and the top surface 122 of the light detection devices 110. Alternatively, the intermediate flow cell device 962 may be formed without a support substrate, such as if the cavities 840 extend only partially through the support frame 834.

As shown in FIGS. 15A and 15B, at least a portion of the exposed top surface 961 of the support material 960 may extend below and between the top surface/side 936 of the support frame 931 and the adjacent top portion 122 of the at least one light detection device 110 positioned within the respective cavity 940. Although only a single light detection device 110 is illustrated in FIGS. 15A and 15B, as discussed above a cavity 940 may include a plurality of spaced light detection devices 110, and the support material 960 may extend between adjacent spaced light detection devices 110. In such an example, the top surface 961 of such portions of the support material 960 may extend below and between the top portions 122 of the adjacent light detection devices 110. The top surface 961 of the support material 960 positioned throughout a respective cavity 940 may thereby comprise a recessed top side surface portion that is positioned below the top side 936 of the support frame 931 and the top portion 122 of the at least one light detection device 110 positioned within a respective cavity 940.

In some such intermediate flow cell devices 962, the top portion 122 of the at least one light detection device 110 positioned within a respective cavity 940 may not include a reaction structure extending thereover, as shown in FIG. 15A. As shown in FIG. 15B, in some such intermediate flow cell devices 962 a reaction structure 120 may be positioned over the top portion 122 of the at least one light detection device 110 and the top side 961 of the support material 960 within a respective cavity 940 that fills in any recessed portions thereof to form a planar top surface from which the plurality of nanowells 16 extend.

It is noted that the reaction structure 120 can be positioned on the top portion 122 of the at least one light detection device 110 over the entirety of the active area of the at least one light detection device 110. The planar top surface of the reaction structure 120 may thereby comprise the top surface of the portion of the reaction structure 120 positioned over the support material 960 within the respective cavity 940, and the top surface of the interstitial areas of the reaction structure 120 may be positioned over the at least one light detection device 110 within a respective cavity 940. The top surface of the portion of the reaction structure 120 positioned over the support material 960 within a respective cavity 940, and the top surface of the interstitial areas of the reaction structure 120 positioned over the at least one light detection device 110 within a respective cavity 940, may thereby be coplanar.

As also shown in FIG. 15B, the reaction structure 120 may further extend over the top surface 936 of the support frame 934. The planar top surface of the reaction structure 120 may thereby also extend over at least the top surface 936 of the support frame 934 about a respective cavity 940. The top surface of the portion of the reaction structure 120 positioned over the support material 960 within a respective cavity 40, the top surface of the portion of the reaction structure 120 positioned over the top surface 936 of the support frame 934 about the respective cavity 940, and the top surface of the interstitial areas of the reaction structure 120 positioned over the at least one light detection device 110 within the respective cavity 940, may thereby be coplanar.

Layer-fabricating processes that may be used to form the reaction structure 120 include photolithography, etching (e.g., reactive-ion etching), sputtering, evaporation, casting (e.g., spin coating), chemical vapor deposition, electrodeposition, epitaxy, thermal oxidation, physical vapor deposition, and the like. In some examples, the reaction structure 120 may be formed using a shadow technique. In some examples, the reaction structure 12 may be formed using nanolithography, such as nanoimprint lithography (NIL). In one example, the reaction structure 120 may be formed, at least in part, via one or more layers of an ultraviolet light (UV) curable resin positioned over the top surface 936 of the support frame 934, the top portion 122 of the at least one light detection device 110, and the top side 961 of the support material 960 within a respective cavity 940 via one or more NIL-related processes.

In one example, the reaction structure 120 may comprise at least one layer positioned over at least the top portion 122 of the light detection device 110 that is configured to have an array of the reaction recesses 16 (e.g., nanowells) (as discussed above with respect to FIG. 1). In another example, the at least one layer of the reaction structure 120 may include pre-formed reaction recesses 16. Optionally, the at least one layer of the reaction structure 120 may be etched to remove portions thereof to form at least a portion of the reaction recesses 16.

In one other example, the reaction structure 120 with the reaction recesses 16 may be formed by shaping the at least one layer of the reaction structure 120. For example, an NIL material may be deposited at least over the top portion 122 of the light detection device 110. The NIL material may comprise a material that is capable of being imprinted using an NIL technique.

For example, the NIL material may comprise a polymer. The NIL material may then be imprinted or stamped with a mold (also called template) having a pattern of features that form the reaction recesses 16 in the NIL layer. In some configurations, the mold is transparent to allow UV or visible light to propagate therethrough. In such configurations, the NIL material may comprise a photocurable polymer that is cured by the UV or visible light while the mold is pressed into the NIL material. Accordingly, the NIL material may cure (e.g., harden) to form the reaction recesses 16. This process may be identical or similar to step-and-flash imprint lithography (SFIL). In other configurations, the NIL material may be cured by application of thermal energy and/or pressure.

FIGS. 16A-16D illustrate an example process of forming a plurality of backside electrical contacts 1072 on the back side of an intermediate flow cell device 1062 that can transmit or conduct the data signals from the circuitry 124 of the at least one light detection devices 110 (based on photons detected by the light sensors 116 thereof) within a respective cavity 1040, such as to transmit the data signals to a biosensor and/or bioassay system when a flow cell formed via the intermediate flow cell device 1062 is utilized therewith. While the intermediate flow cell device 1062 is shown with the configuration of intermediate flow cell device 62 of FIGS. 11A and 11B, the intermediate flow cell device 1062 may configured differently, such as the configurations of intermediate flow cell device 662 of FIGS. 12A and 12B or intermediate flow cell device 762 of FIGS. 13A and 13B, and therefore like reference numerals preceded with "10" are used to indicate like components, aspects, functions, processes or functions, and the description above directed to thereto equally applies, and is not repeated for brevity and clarity purposes. It is noted that the backside contacts 1072 on the back side of an intermediate flow cell device 1062 are coupled to backside vias 128 of the at least one light detection device 110 within a respective cavity 1040. Therefore, the while the intermediate flow cell device 1062 is shown utilizing light detection devices 110 of FIG. 2, other light detection device configurations that include backside vias 128 may be equally utilized.

Figure 16A:
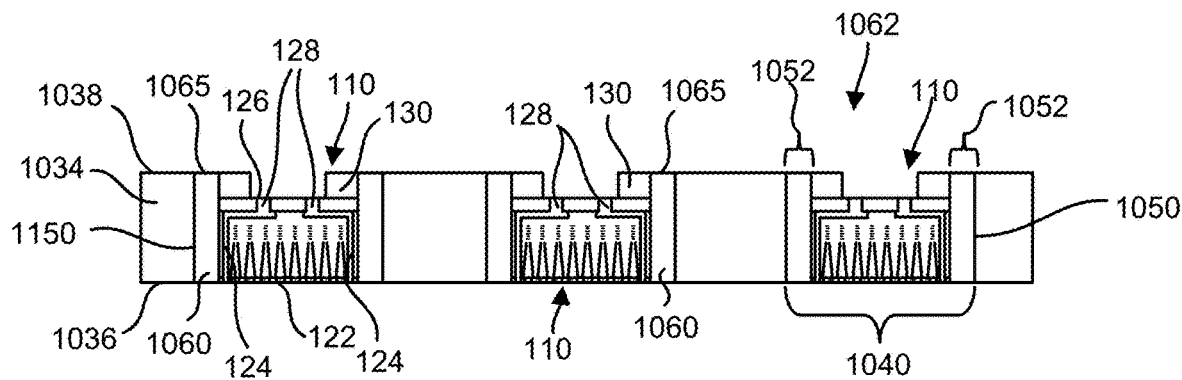
FIG. 16A illustrates, in one example, a cross-section of an intermediate flow cell device including a plurality of light detection devices coupled within a plurality of cavities of a support frame, in accordance with one or more aspects of the present disclosure.
Figure 16B:
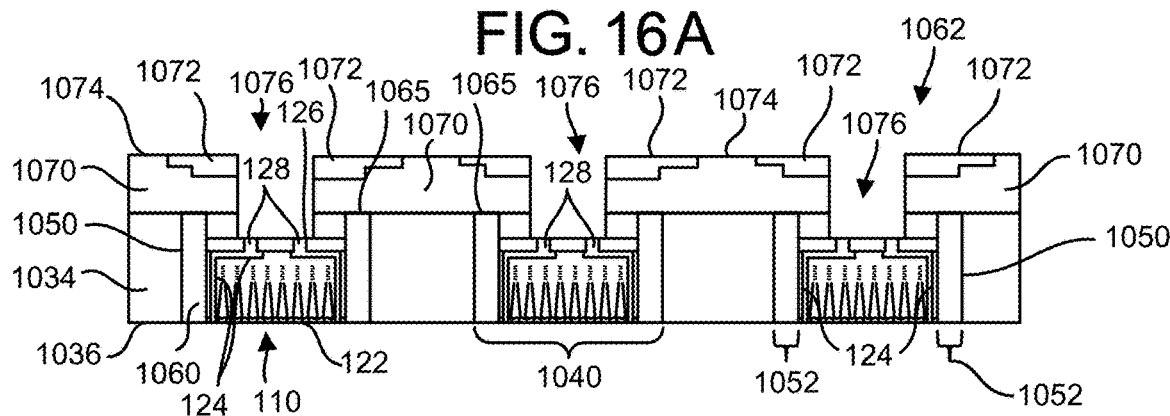
FIGS. 16B-16D illustrate, in one example, formation of backside contacts on the intermediate flow cell device of FIG. 16A.

As shown in FIGS. 16A and 16B, a non-electrically conductive substrate or material 1070 is positioned on a back side of the intermediate flow cell device 1062. As also shown in FIGS. 16A and 16B, the back side 1074 of the substrate 1070 includes the plurality of exposed electrically conductive backside contacts 1072 coupled thereto. The backside contacts 1072 may be at least partially embedded within the back side 1074 of the substrate 1070. A backside contact 1072 (potentially a separate and distinct backside contract 1072) may be provided for each backside via 128 (i.e., an exclusively associated via 128) of each light detection device 110 within each cavity 1040. As shown in FIG. 16B, adjacent backside contacts 1072 may be spaced from each other, and a portion of the substrate 1070 may extend therebetween.

The substrate 1070 may comprise any electrically non-conductive material or semiconductor material, such as a polymer (e.g., an epoxy), silicon, glass, ceramic or a combination thereof. The backside contacts 1072 may comprise any electrically conductive material, such as a metal (e.g., copper). In some examples, the substrate 1070 and the backside contacts 1072 may comprise a printed circuit board.

As shown in FIG. 16B, the substrate 1070 and/or the backside contacts 1072 may comprise through-holes 1076 that at least partially align (e.g., overlap) the back side 126 of the at least one light detection device 110 within each cavity 1040 of the support frame 1034. The through-holes 1076 thereby at least partially align (e.g., overlap) with the opening/space between the spacers 130 (if provided) and the vias 128 extending through the base wafer portion 114 at the back side 126 of the at least one light detection device 110 within each cavity 1040.

Figure 16C:
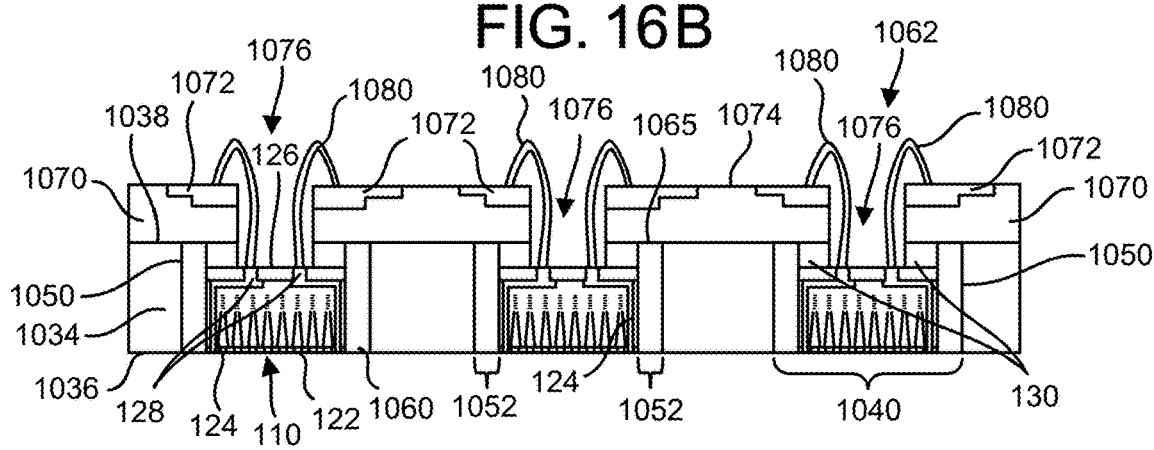

As shown in FIG. 16C, an electrically conductive wires or other structures 1080 may be coupled between the vias 128 of the at least one light detection device 110 within each cavity 1040 and the adjacent or associated backside contacts 1072. The wires 1080 may comprise any electrically conductive material, such as a metal (e.g., copper). The wires 1080 can transmit the data signals from the vias 128 of the circuitry 124 of the at least one light detection device 110 to the backside contacts 1072. Each wire 1080 may thereby extend from a respective contact 1072 on the backside of the intermediate flow cell device 1062, into and through an adjacent or associated through-hole 1076, and to a respective via 128 of a light detection device 110 within a cavity 1040 of the support frame 1034, as shown in FIG. 16C. In some examples, the wires 1080 may be spaced inwardly from the inner side walls of the through-holes 1076.

Figure 16D:
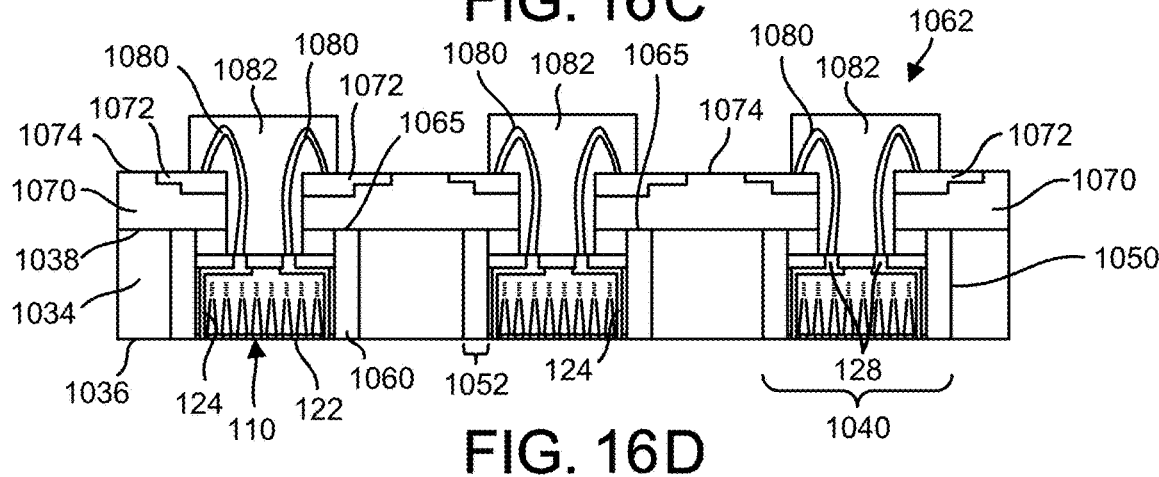

With the wires 1080 coupled between respective vias 128 and backside contacts 1072, the wires 1080 may be covered, enclosed/encased within insulative portions 1082, as shown in FIG. 16D. The insulative portions 1082 may comprise an electrically insulative material so as to electrically insulate the wires 1080. As shown in FIG. 16D, the insulative portions 1082 may cover the portion (or entirety) of the back side 126 of the at least one light detection device 110 within each cavity 1040 that is exposed to a through-hole 1076. For example, the insulative portion 1082 may extend over and fill the space between the spacers 130 (if provided) of each light detection device 110 with a respective cavity 1040.

Figure 17A:
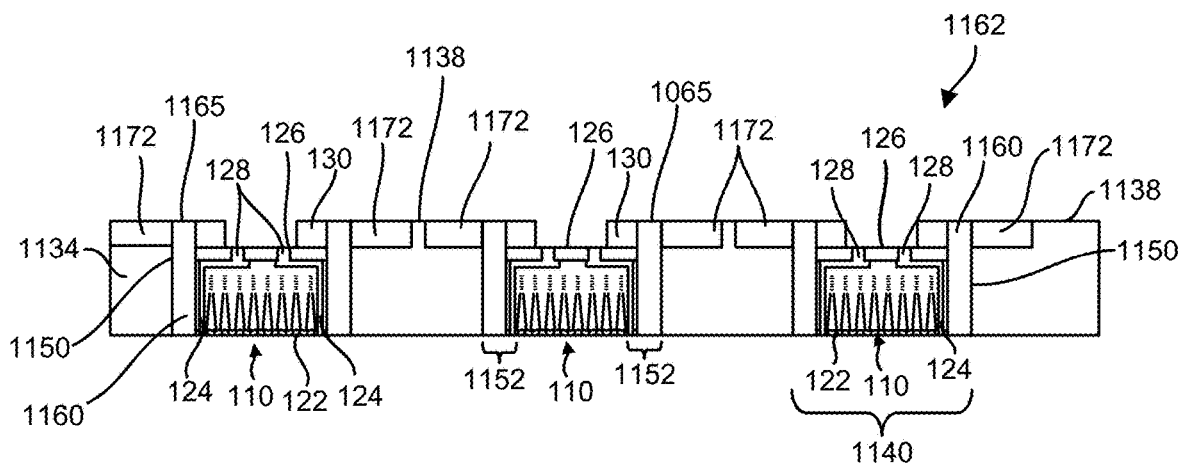
FIG. 17A illustrates, in one example, a cross-section of another intermediate flow cell device including a plurality of light detection devices coupled within a plurality of cavities of a support frame, in accordance with one or more aspects of the present disclosure.
Figure 17B:
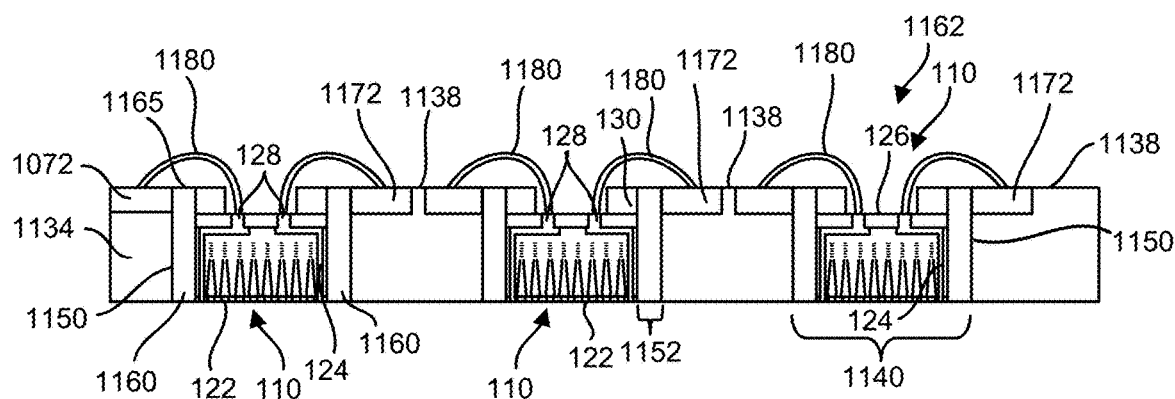
FIGS. 17B and 17C illustrate, in one example, formation of backside contacts on the intermediate flow cell device of FIG. 17A.
Figure 17C:
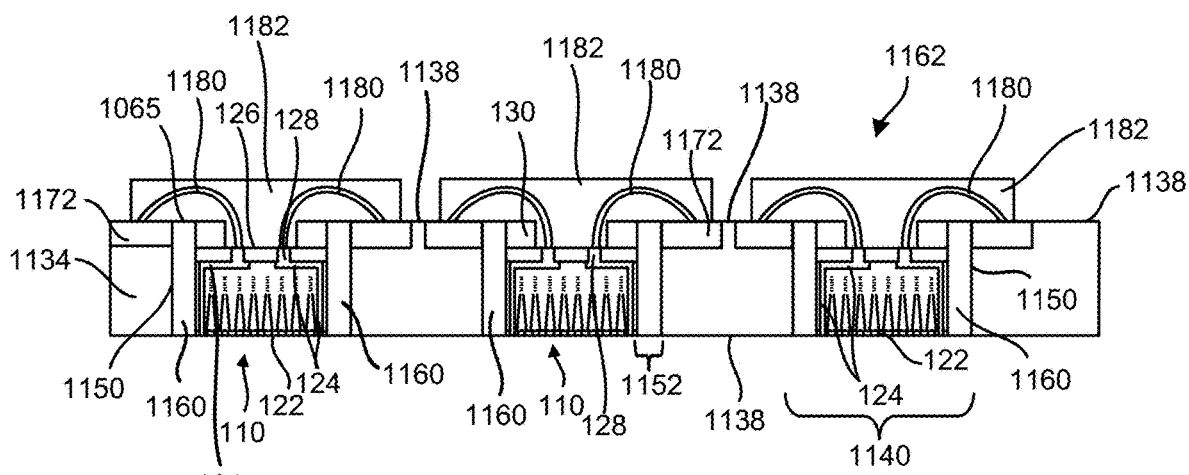

Each insulative portion 1082 may also fill the through-hole 1076, and extend over only a portion of the backside contacts 1072 associated with each cavity 1040 so as to form exposed portions of the backside contacts 1072. For example, an insulative portion 1082 may extend only over the portions the backside contacts 1072 that couple with respective wires 1080 (and encase the wires 1080), such as portions of the backside contacts 1072 that are proximate (e.g., adjacent) to a respective through-hole 1076. The portions of the backside contacts 1072 that are void of an insulative portion 1082 (e.g., portions that are distal to a respective through-hole 1076) may thereby be left exposed. The exposed portions of the backside contacts 1072 can be coupled to another structure or device to transmit the data signals from the at least one light detection device 110 thereto. It is noted that after the insulative portions 1082 are formed, the intermediate flow cell device 1062 may be diced to form one or more flow cells therefrom, as explained further below. For example, the intermediate flow cell device 1062 may be diced prior or subsequent to formation of reaction structures on the light detection devices 110 (if not already formed), formation of reaction sites on the reaction structures of the light detection devices 110, and/or lidding, for example FIGS. 17A-17C illustrate another process of forming a plurality of backside electrical contacts 1172 on the back side of an intermediate flow cell device 1162 that can transmit or conduct the data signals from the circuitry 124 of the at least one light detection devices 110 (based on photons detected by the light sensors 116 thereof) within a respective cavity 1140, such as transmit the data signals to a biosensor and/or bioassay system when a flow cell formed via the intermediate flow cell device 1162 is utilized therewith. The process of forming the plurality of backside electrical contacts 1172 and the intermediate flow cell device 1162 of FIGS. 17A-17C is similar to the process and intermediate flow cell device 1062 of FIGS. 16A-16D, and therefore like reference numerals preceded with "11" are used to indicate like components, aspects, functions, processes or functions, and the description above directed to thereto equally applies, and is not repeated for brevity and clarity purposes.

Figure 18A:
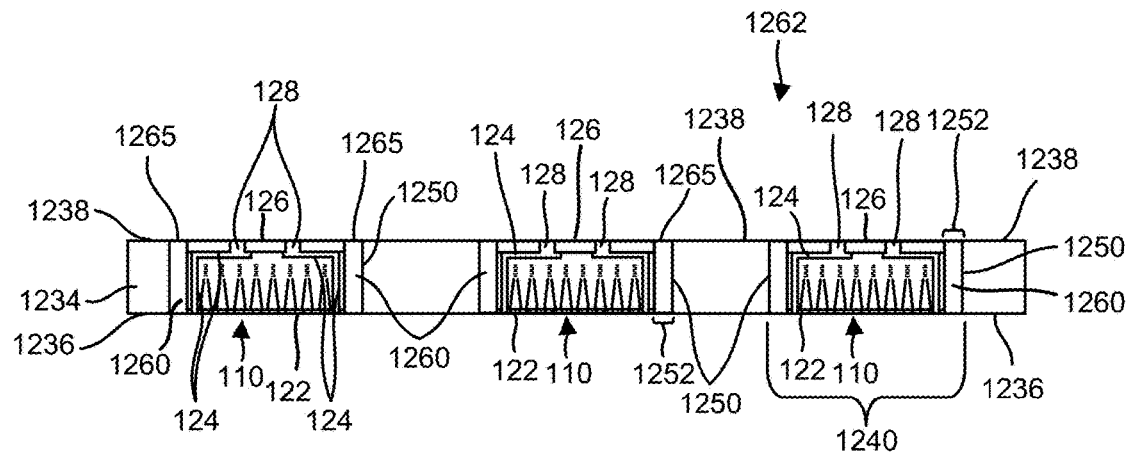
FIG. 18A illustrates, in one example, a cross-section of another intermediate flow cell device including a plurality of light detection devices coupled within a plurality of cavities of a support frame, in accordance with one or more aspects of the present disclosure.
Figure 18B:
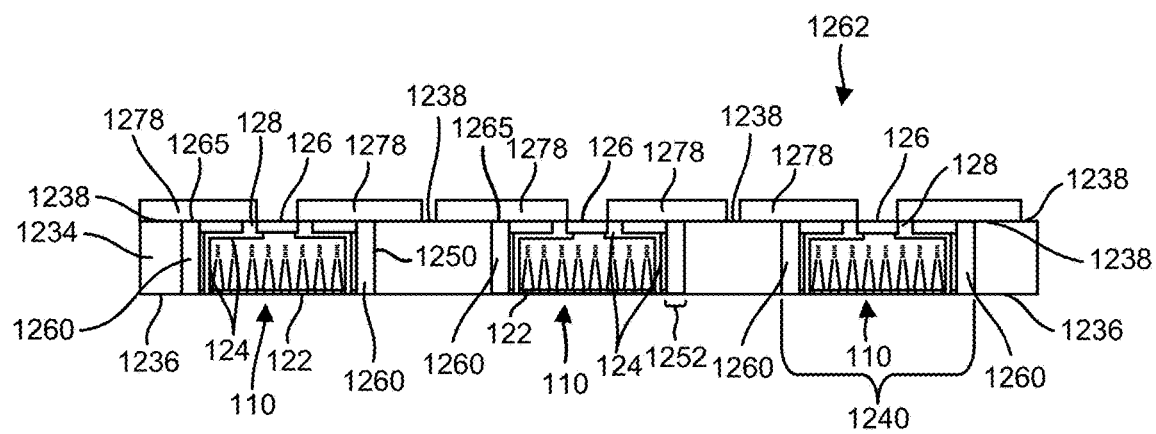
FIGS. 18B and 18C illustrate, in one example, formation of backside contacts on the intermediate flow cell device of FIG. 18A.
Figure 18C:
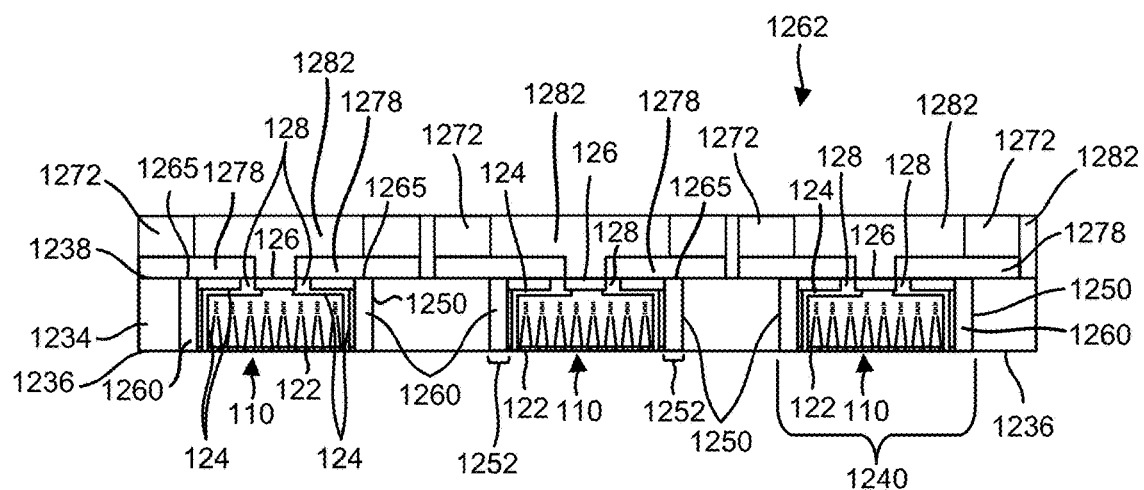

As shown in FIG. 17A, the electrically conductive backside contacts 1172 are provided at the bottom side 1138 of the support frame 1134. For example, the backside contacts 1172 may be at least partially embedded into the bottom side 1138 of the support frame 1134, as shown in FIG. 17A. As shown in FIG. 17A, adjacent backside contacts 1172 may be spaced from each other, and a portion of the support frame 1134 may extend therebetween. In some examples, the backside contacts 1172 may comprise a bottom portion of the cavities 1140 of the support frame 1134 (i.e., for a portion of the side walls 1150 of the support frame 1134 that form the cavities 1140). In one examples, the backside contacts 1172 and the support frame 1134 may comprise a printed circuit board. As shown in FIG. 17B, the wires 1190 may extend from a respected via 128 of a light detection device 110, past the back side 122 thereof, and to a proximate (e.g., adjacent) backside contact 1172. After the wires are coupled to the vias 128 and the backside contacts 1172, the entirety of the back side 122 light detection devices 110 and a portion of the backside contacts 1172 that the wires 1180 are coupled to are covered by the insulative portions 1182, as shown in FIG. 17C. The wires 1180 are also fully encased by the insulative portions 1182. The insulative portions 1182 only cover a portion of the backside contacts 1172 to leave an exposed portion thereof for mating with another structure or device to transmit the data signals from the at least one light detection device 110 thereto. It is noted that after the insulative portions 1182 are formed, the intermediate flow cell device 1162 may be diced to form one or more flow cells therefrom, as explained further below. For example, the intermediate flow cell device 1162 may be diced prior or subsequent to formation of reaction structures on the light detection devices 110 (if not already formed), formation of reaction sites on the reaction structures of the light detection devices 110, and/or lidding, for example FIGS. 18A-18C illustrate another process of forming a plurality of backside electrical contacts 1272 on the back side of an intermediate flow cell device 1262 that can transmit or conduct the data signals from the circuitry 124 of the at least one light detection devices 110 (based on photons detected by the light sensors 116 thereof) within a respective cavity 1240, such as transmit the data signals to a biosensor and/or bioassay system when a flow cell formed via the intermediate flow cell device 1262 is utilized therewith. The process of forming the plurality of backside electrical contacts 1272 and the intermediate flow cell device 1262 of FIGS. 18A-18C is similar to the process and intermediate flow cell device 1062 of FIGS. 16A-16D and the process and intermediate flow cell device 1162 of FIGS. 17A-17C, and therefore like reference numerals preceded with "12" are used to indicate like components, aspects, functions, processes or functions, and the description above directed to thereto equally applies, and is not repeated for brevity and clarity purposes.

As shown in FIG. 18A, the intermediate flow cell device 1262 may include at least one light detection device 110 within each cavity 1240 that is void of spacers on the back side 126. However, in alternative examples, the at least one light detection device 110 within one or more cavities 1240 may include spacers on the back side 126 (as shown in FIG. 2). As shown in FIG. 18A, the vias 128 of the electrical circuitry 124 of the light detection devices 110 may be exposed at the back side 126. In one example, as shown in FIG. 18A, the exposed ends of the vias 128 at the back side 126 of the light detection devices 110 may be substantially aligned (e.g., co-planar) with the back side 1238 of the support frame 1234 and/or the back side.

As shown in FIG. 18B, a plurality of electrically conductive intercontacts 1278 can be positioned over the back side of the intermediate flow cell devices 1262. The intercontacts 1278 may comprise any electrically conductive material, such as a metal (e.g., copper), so as to transmit the data signals from an associated light detection device 110. Each intercontact 1278 is electrically coupled to the exposed end surface of a respective via 128 at the back side 126 of a light detection device 110, and extends over the back side 1265 of the filling material 1260 within the channel 1252 adjacent to the light detection device 110, and a portion of the back side 1238 of the support frame 1234. As shown in FIG. 18B, adjacent intercontacts 1278 on the back side 1238 of the support frame 1234 may be spaced from each other, and a portion of the support frame 1234 may extend therebetween. Similarly, adjacent intercontacts 1278 on the back side 126 of a light detection device 110 may be spaced from each other.

With the intercontacts 1278 positioned on the back side 1238 of the support frame 1234, the back side 1265 of the filling material 1260 and the back side 126 of the light detection devices 110 such that they are electrically coupled to the vias 128 of the light detection devices 110, the plurality of backside contacts 1272 may be positioned over (e.g., on) portions of the intercontacts 1278 such that they are electrically coupled, as shown in FIG. 18C. In some examples, the backside contacts 1272 may be positioned on portions of the intercontacts 1278 that are positioned (fully or partially) over the support frame 1234 and/or the filling material 1260, as shown in FIG. 18C.

As also shown in FIG. 18C, the insulative material 1282 may also be positioned over the intercontacts 1278. The insulative material 1282 may extend over the exposed surface areas of the intercontacts 1278. The insulative material 1282 may also extend over the back side 126 of the light detection devices 110 and over the bottom side 1238 of the support frame 1238 between adjacent intercontacts 1278 and backside contacts 1272. In this way, the insulative material 1282 may cover or encase the back side of the intermediate flow cell device 1262 but for the backside contacts 1272. The exposed portions of the backside contacts 1272 are thereby able to mate with another structure or device to transmit the data signals from least one light detection devices 110 thereto. It is noted that after the insulative material 1282 and backside contacts 1272 are formed, the intermediate flow cell device 1262 may be diced to form one or more flow cells therefrom, as explained further below. For example, the intermediate flow cell device 1262 may be diced prior or subsequent to formation of reaction structures on the light detection devices 110 (if not already formed), formation of reaction sites on the reaction structures of the light detection devices 110, and/or lidding, for example.

Figure 19A:
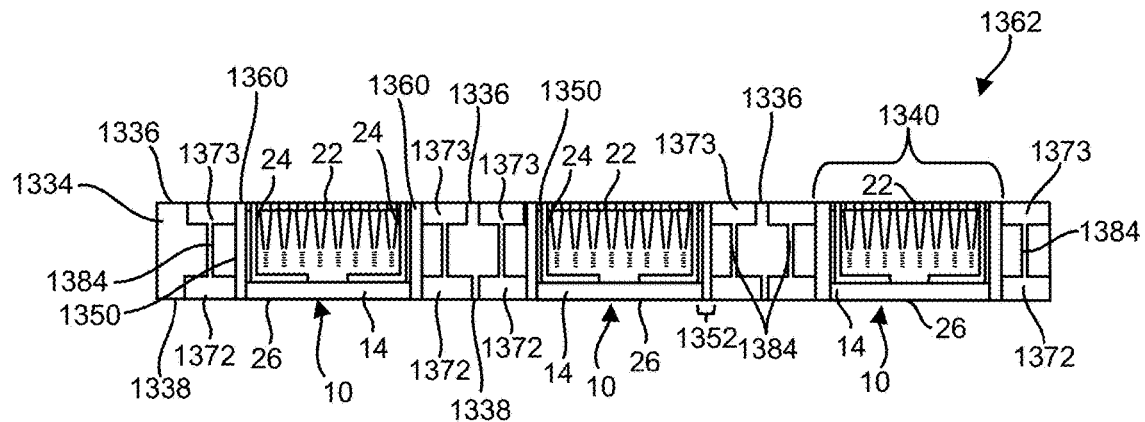
FIG. 19A illustrates, in one example, a cross-section of another intermediate flow cell device including a plurality of light detection devices coupled within a plurality of cavities of a support frame, in accordance with one or more aspects of the present disclosure.
Figure 19B:
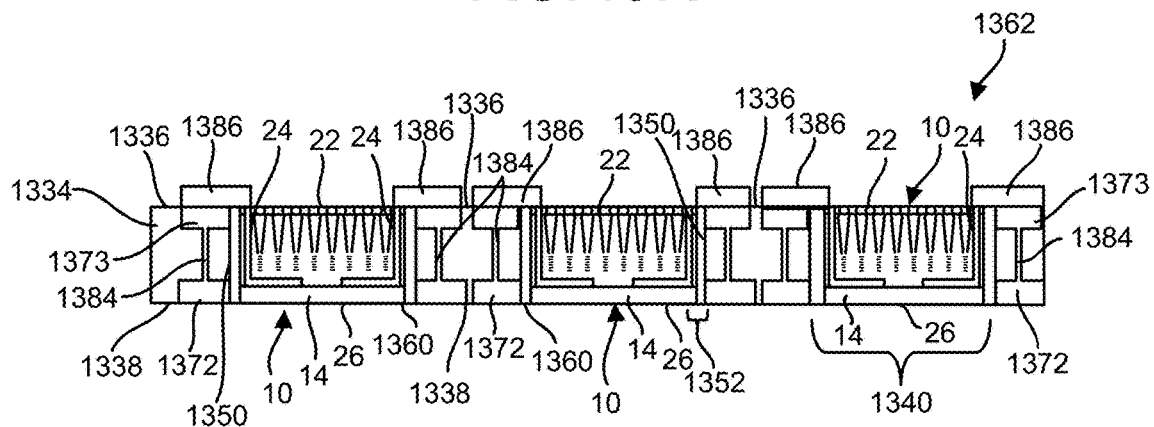
FIGS. 19B and 19C illustrate, in one example, formation of backside contacts on the intermediate flow cell device of FIG. 19A.
Figure 19C:
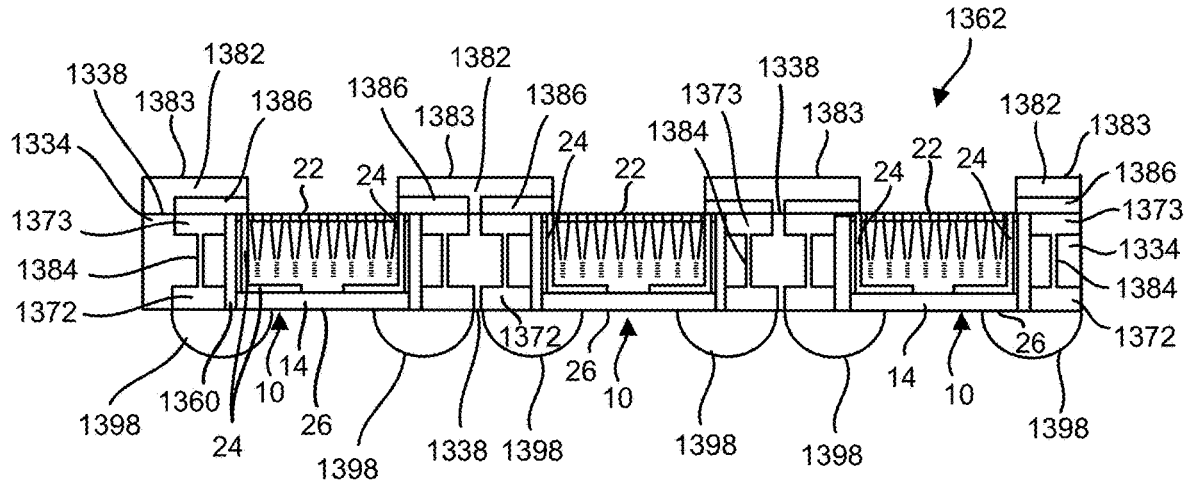

FIGS. 19A-19C illustrate a process of forming a plurality of backside electrical contacts 1372/1398 on the backside of an intermediate flow cell device 1362 that can transmit or conduct the data signals from the circuitry 24 of the at least one light detection device 10 (based on photons detected by the light sensors 16 thereof) within a respective cavity 1340, such as to transmit the data signals to a biosensor and/or bioassay system when a flow cell formed via the intermediate flow cell device 1362 is utilized therewith. The process of forming the plurality of backside electrical contacts 1372 and the intermediate flow cell device 1362 of FIGS. 19A-19C is similar to the process and intermediate flow cell device 1062 of FIGS. 16A-16D, the process and intermediate flow cell device 1162 of FIGS. 17A-17C and the process and intermediate flow cell device 1262 of FIGS. 18A-18C, and therefore like reference numerals preceded with "13" are used to indicate like components, aspects, functions, processes or functions, and the description above directed to thereto equally applies, and is not repeated for brevity and clarity purposes. Further, although the light detection devices 10 of the FIG. 1 are shown in each cavity 1340, as discussed above other light detection devices may be equally utilized, such as the light detection device 110 of FIG. 2. It is noted that light detection devices that are void of vias extending through the base wafer portion 14 thereof may be advantageous for use with the support frame 1362 and formation of the intermediate flow cell device 1362.

As shown in FIG. 19A, the intermediate flow cell device 1362 includes a support frame 1224 with a plurality of electrically conductive vias 1384 extending therethrough from the top surface 1336 to the bottom surface 1338. The vias 1384 may comprise any electrically conductive material, such as a metal (e.g., copper), so as to transmit the data signals from an associated light detection device 110. The portions of the vias 1384 at the bottom side 1338 of the support frame 1334 (i.e., at the backside of the intermediate flow cell device 1362) are exposed and form backside electrical contact portions 1372, as shown in FIG. 19A. Similarly, as also shown in FIG. 19A, the portions of the vias 1384 at the top side 1336 of the support frame 1334 (i.e., at the frontside of the intermediate flow cell device 1362) are exposed and form frontside electrical contact portions 1373. The backside electrical contact portions 1372 and/or the frontside electrical contact portions 1373 may be enlarged (e.g., define a greater cross-sectional area) than a medial portion of the vias 1384 extending therebetween, as shown in FIG. 19A.

Adjacent vias 1384 of the support frame 1334 may be spaced from each other, and a portion of the support frame 1334 may extend therebetween. For example, adjacent frontside electrical contact portions 1373 may be spaced from one another, and a portion of the support frame 1334 at the top side 1336 of the support frame 1334 may extend therebetween, as shown in FIG. 19A. Similarly, adjacent backside electrical contact portions 1372 may be spaced from one another, and a portion of the support frame 1334 at the bottom side 1338 of the support frame 1334 may extend therebetween.

As shown in FIG. 19B, a plurality of electrically conductive intercontacts 1386 may be positioned on the frontside of the intermediate flow cell device 1362 to electrically couple the device circuitry 24 of the at least one light detection device 10 within each cavity 1340 of the support frame 1334 with the frontside electrical contact portions 1386 of the vias 1384 of the support frame 1334. Each intercontacts 138 may extend over the portion of the top side 22 of a light detection device 10 that includes an exposed portion of the circuitry 24, the top side of the support material 1360 adjacent to the light detection device 10 within the edge cavity portion 1352, and the exposed top surface of the frontside electrical contact portions 137 of the vias 1384. The intercontacts 138 may thereby electrically couple the device circuitry 24 of the at least one light detection device 10 within a cavity 1340 to the vias 1384 extending through the support frame 1334 so that data signals from the at least one light detection device 10 are transmitted (i.e., conducted) therethrough and to the backside electrical contact portions 1373.

As shown in FIG. 19C, insulative material portions 1382 may be positioned over the intercontacts 1386. The insulative material 1382 may extend at least over the exposed surface areas of the intercontacts 1386. The insulative material 1382 may also extend over the top side 1336 of the support frame 1334 between adjacent intercontacts 1386. In this way, the insulative material 1382 may cover or encase at least a portion of the electrically conductive components or portions of the intermediate flow cell device 1262 at the top side thereof. The insulative material 1382 may comprise an exposed top surface 1383 that is substantially planar and/or smooth, as shown in FIG. 19C. For example, the top surfaces 1383 of the insulative material 1382 may include/define a submicron-scale surface roughness. In some such examples, the top surfaces 1383 of the insulative material 1382 may include/define a surface roughness less than or equal to 50 mn, or less than or equal to 10 nm. In one example, the top surfaces 1383 of the insulative material 1382 may include or define a surface roughness within the range of 1-2 nm.

The exposed portions of the backside contacts 1372 can mate with another structure or device to transmit the data signals from the respective light detection devices 10. For example, as shown in FIG. 19C, electrically conductive leads or balls 1398 (e.g., partial spheres) or may be positioned over (e.g., on) the exposed surfaces of the backside electrical contact portions 1373 of the vias 1384 to transmit or conduct the signals of the at least one light detection devices 10 within the cavities 1340, such as to a biosensor and/or bioassay system. The balls 1398 may comprise any electrically conductive material, such as a metal solder. Each ball 1398 may extend over the exposed surface of a respective backside electrical contact portions 1373, over the exposed bottom surface of the support material 1360 adjacent to the respective backside electrical contact portions 1373, and a portion of the back side 26 of the light detection device 10 associated with the respective backside electrical contact portions 1373, as shown in FIG. 19C. The balls 1398 may comprise a ball grid arrangement (BGA) type surface mount packaging configuration of the intermediate flow cell device 1362 (and, ultimately, one or more flow cells formed thereby).

At least one flow cell may be formed from an intermediate flow cell device disclosed herein by, for example, forming a reaction structure on the light detection devices, forming reaction sites on the reaction structures of the light detection devices, lidding of the light detection devices and/or dicing the intermediate flow cell device. Further, at least one flow cell may be formed via the intermediate flow cell by dicing the intermediate flow cell into one or more discrete cells that includes at least one light detection device, a lid extending thereover, and a flow channel formed between the light detection device and the lid. As noted above, the support frame 1334 may include visual indications to aid in alignment during the lidding and/or dicing operations, for example.

In some examples, one or more flow cells may be formed via an intermediate flow cell prior to formation of the backside contacts electrically coupled to the at least one light detection device thereof. For example, at least one flow cell 1302 may be formed from the intermediate flow cell device 1362 of FIG. 19A, the intermediate flow cell device 1062 of FIG. 16A, the intermediate flow cell device 1162 of FIG. 17A, the intermediate flow cell device 1262 of FIG. 18A or the intermediate flow cell device 1362 of FIG. 19B or 19C. In some other examples, one or more flow cells may be formed via an intermediate flow cell subsequent to the formation of the backside contacts electrically coupled to the at least one light detection device thereof. For example, at least one flow cell 1302 may be formed from the intermediate flow cell device 1062 of FIG. 16D, the intermediate flow cell device 1162 of FIG. 17C, the intermediate flow cell device 1262 of FIG. 18C or the intermediate flow cell device 1362 of FIG. 19C.

Figure 20:
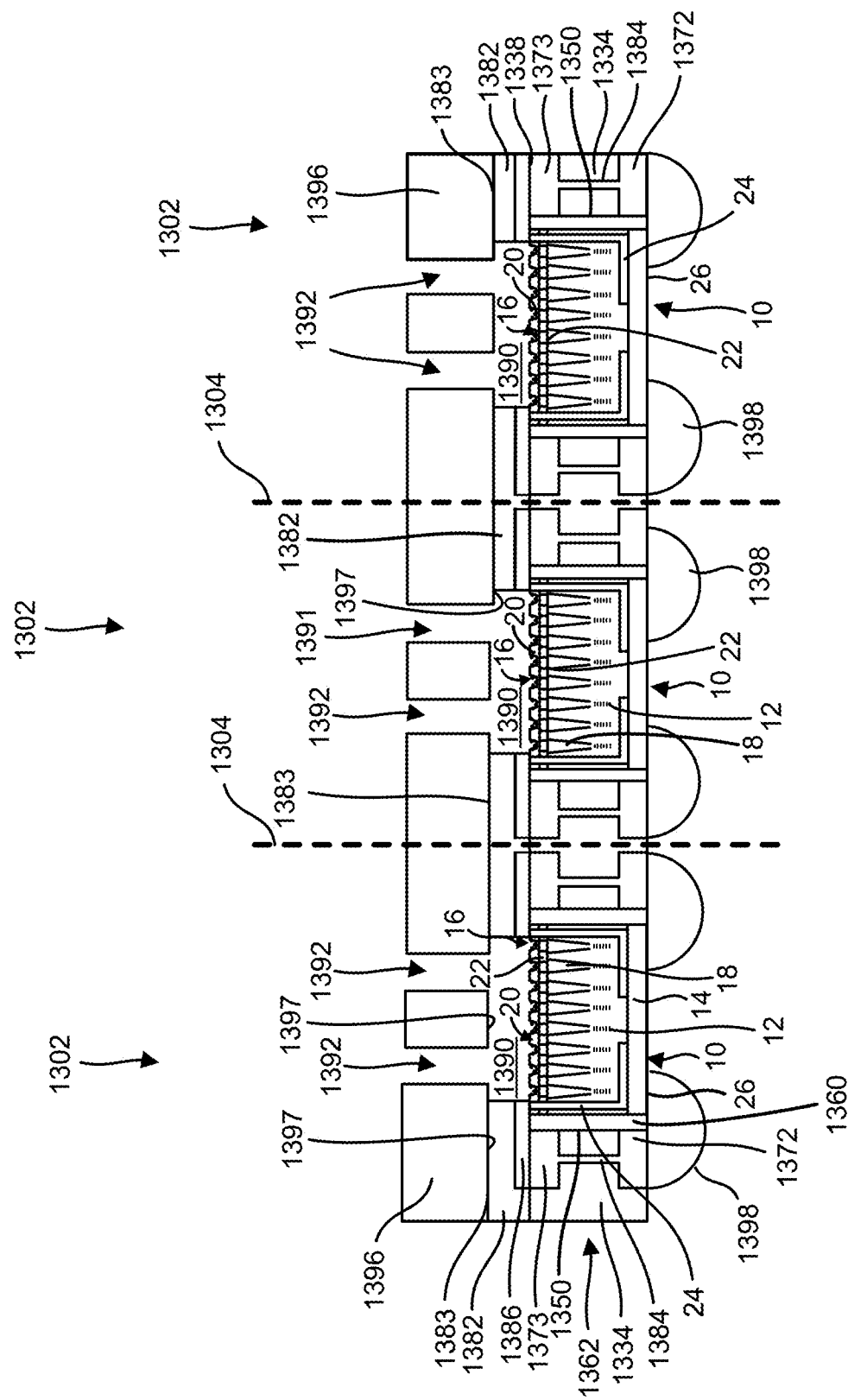
FIG. 20 illustrates, in one example, a plurality of flow cells formed via the intermediate flow cell device of FIG. 19C, in accordance with one or more aspects of the present disclosure.

FIG. 20 illustrates one or more flow cells 1302 formed from the intermediate flow cell device 1362 of FIG. 19C. Although the intermediate flow cell device 1362 of FIG. 19B is illustrated as forming the one or more flow cells 1302 of FIG. 20, the intermediate flow cell device 1062 of FIG. 16A or 16D, the intermediate flow cell device 1162 of FIG. 17A or 17C, the intermediate flow cell device 1262 of FIG. 18A, 18B or 18C or the intermediate flow cell device 1362 of FIG. 19A or 19B, for example, may equally be employed.

As shown in FIG. 20, a lid/cover 1396 may extend over the front/top side of the intermediate flow cell device 1362. For example, a bottom surface 1397 of the lid 1396 may be adhered to the exposed top surface of the intermediate flow cell device 1362, such as to the top surface 1383 of the insulative material 1382, as shown in FIG. 20. In this way, the lid 1396 may extend over the top portion 20 of the at least one light detection 10 positioned within each cavity 1340, which may include the reaction structure with a detector surface as described above.

Figure 21:
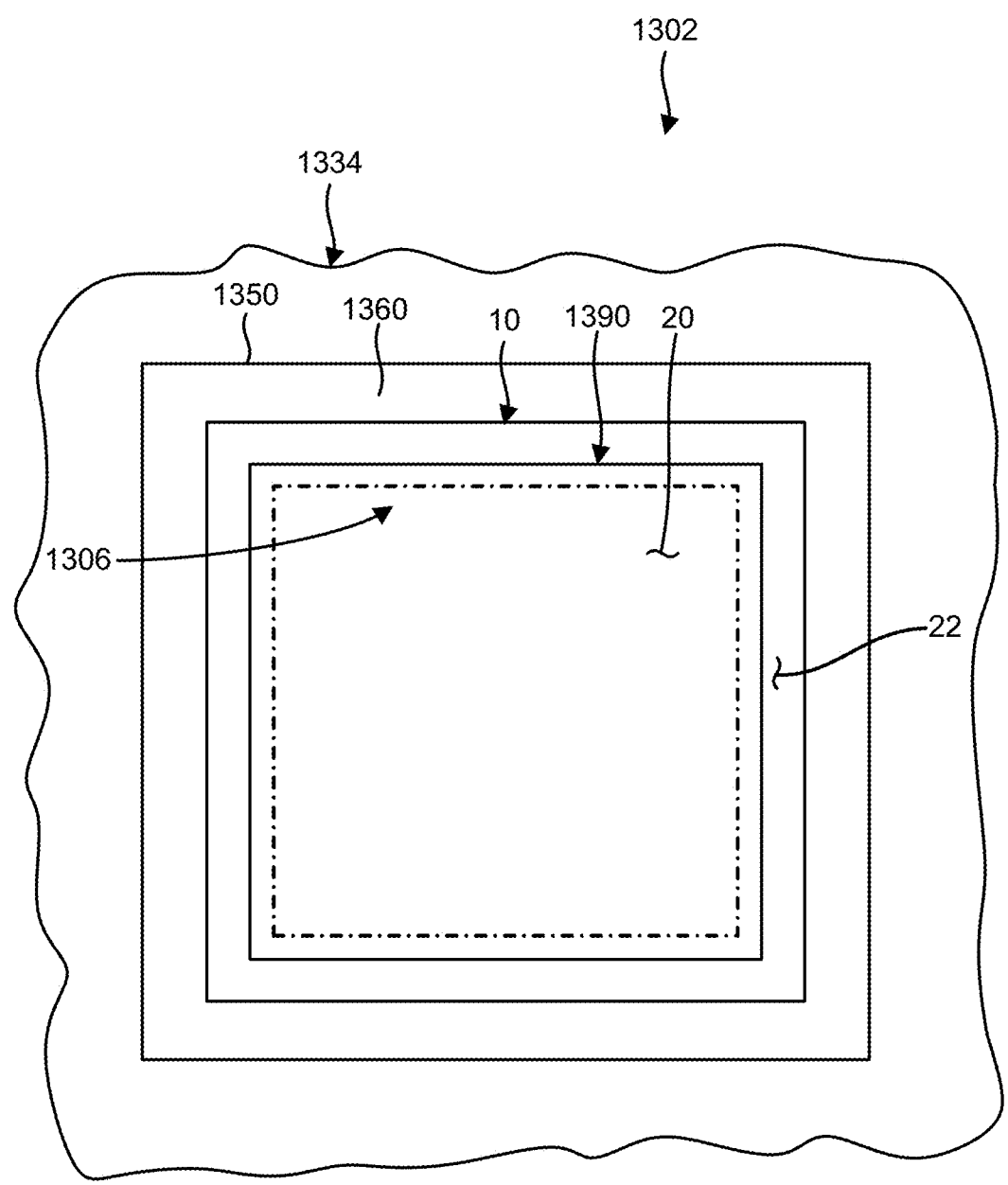
FIG. 21 illustrates, in one example, a flow channel and active area of a light detection device of a flow cell of FIG. 20, in accordance with one or more aspects of the present disclosure.

As shown in FIG. 20, the bottom surface 1397 of the lid 1396 may be spaced above the top portion 22 of the at least one light detection 10 positioned within each cavity 1340 such that a flow channel 1390 is formed therebetween. Each flow channel 1390 is configured (e.g., sized and shaped) to direct a fluid, such as the reaction solution, along the detector surface of the reaction structure 20 of the associated at least one light detection device 10. As shown in FIG. 20, the lateral sides of the flow channels 1390 may be defined by the insulative material 1382 and/or the frontside electrical contact portions 1386. The area of the flow channels 1390 may substantially align/overlap with the at least one light detection device 10 of each respective cavity 1340. For example, the area of the flow channels 1390 may be substantially aligned and congruent/consistent with the active area of the at least one light detection device 10 of each respective cavity 1340, as shown in FIG. 20. In some other examples, the area of the flow channels 1390 may substantially align with the and extend beyond the active area of the at least one light detection device 10 of each respective cavity 1340, as shown in FIG. 21. As noted above, the support frame 1334 may include visual indications to aid in alignment of the positioning of the lid 1396.

In some examples, the flow channels 1390 may include a height (extending between the bottom surface 1397 of the lid 1396 and the top portion 22 of the at least one light detection 10 (e.g., a detector surface thereof) within the range of about 50-400 µm, or more within the range of about 80-200 µm, for example. In one example, the height of the flow channels 1390 is about 100 µm. The overall thickness of lid 1362 can be, for example, from about 300 µm to about 1000 µm.

In some other examples, the lid 1396 may be indirectly coupled to the top surfaces of the at least one light detection 10, the support material 1360 and/or the support frame 1334 via an intervening layer/portion other than the insulative material 1382 and/or the frontside electrical contact portions 1386, which may or may not at least partially define the lateral sides of the flow channels 1390. In other examples, the lid 1362 may be directly coupled to the top surfaces of the at least one light detection 10, the support material 1360 and/or the support frame 1334 (e.g., insulative material thereof or a via 1384 thereof, such as bonded directly thereto via a low autofluorescence adhesive. In such an example, the lid 1362 may include side wall portions that that space the bottom surface 1397 of the lid 1396 extending over the at least one light detection 10 above the top portion 22 of the at least one light detection 10. The side wall portions of such a lid 1362 may define the lateral sides of the flow channels 1390.

As also shown in FIG. 20, the lid 1362 may include at least one port 1362 that is configured to fluidically engage a flow channel 1390 and, potentially, other ports (not shown). For example, the other ports may be from a cartridge or a workstation that comprise the reaction solution or another biological or chemical substance. In some examples, the lid 1362 may include at least two ports 1392 associated within each flow channel 1390 as inlet and outlet ports to the flow channel 1390. In some examples, the diameter of at least two ports 1392 may be about 750 µm. The at least one port 1362 allows for the for the flow of a reagent fluid or solution to flow into, and potentially through, the associated flow channel 1390. As explained above, chemical reactions may take place between the reagent solution and the reaction sites on the detector surface of the reaction structure 20 on the top portion 22 in a flow channel 1390. When illuminated through the lid 1362, the light detection device 10 of the flow cell 1302 is able to sense the chemical reactions that take place in the flow channel 1390 and produce signals in response thereto. As explained above, the signals may be conducted through the circuitry 24 of the light detection device 10 and to the backside contacts 1372 (and ball contacts 1398, if provided). The lid 1362 may thereby comprise a material that is transparent to the excitation light propagating from an exterior of flow cells 1302 and toward/into the flow channels 1390. It is noted that excitation light may approach the lid 1362 from any angle, and along the same or different angles. In some examples, the lid 1362 may comprise a material that is optically transparent to at least the excitation light and has low or no autofluorescence, such as, but not limited to, cyclic olefin copolymer (COC).

As shown in FIG. 20, the reaction structure 20 may be positioned on the top portion 22 of each light detection 10 prior or subsequent to the attachment of the lid 1362 to the intermediate flow cell device 1362. As explained above and further below, the detector surface of the reaction structure 20 on the top portion 22 of each light detection 10 may extend over the entire active area of each respective light detection device 10. As discussed above, the detector surface of the reaction structure 20 may include nanowells 16 that extend into the reaction structure 20 and planar interstitial surface areas extending between and about the nanowells 16.

The detector surface of each light detection device 10 may be functionalized (e.g., chemically or physically modified in a suitable manner for conducting the designated reactions). For example, the detector surface may be functionalized and may include at least one reaction site on/within the nanowells 16 having one or more biomolecules immobilized thereto. The reaction sites may include biological or chemical substances that are configured to initiate a reaction and/or form a reaction product that generates or emits light signals in response to the excitation light. In particular examples, the reaction sites may include clusters or colonies of biomolecules (e.g., oligonucleotides) that are immobilized on the detector surface within the nanowells 16. For example, the reactions sites may generate light emissions in response to incident excitation light after treatment with the reaction solution. The excitation light may be emitted or produced from any illumination system or source (not shown), which may or may not be part of the flow cell 1302. In some examples, the illumination system may emit the excitation light at a certain wavelength or wavelengths that excites the biological or chemical substance(s) of the reaction sites (e.g., a reaction initiated by the reaction solution and/or reaction product formed by the reaction solution at the reactions sites 114).

Initially, the reaction sites of the nanowells 16 of the reaction structure 20 of the light detection devices 10 may not include a designated reaction. As discussed above, a reaction site may include biological or chemical substances immobilized to the detector surface on the base and/or side surfaces of the nanowells 16. In particular examples, the reaction sites are located proximate to an opening of at least one corresponding light guide 18 so that designated or predefined light emissions emitted from the reaction sites after a designated reaction has occurred via treatment with the reaction solution propagate through the reaction structure 20, through the at least one corresponding light guide 18, and to at least one corresponding light sensor 12.

The biological or chemical substances of a single reaction site may be similar or identical (e.g., a colony of analytes (e.g., oligonucleotides) that have a common sequence). However, in other examples, a single reaction site and/or nanowell 16 may include differing biological or chemical substances. Before a designated reaction, the reaction sites may include at least one analyte (e.g., an analyte-of-interest). For example, the analyte may be an oligonucleotide or a colony thereof (e.g., an oligonucleotide-of-interest). The oligonucleotides may have an effectively common sequence and bind with a predefined or particular fluorescently labeled biomolecule, such as a fluorescently-labeled nucleotide.

However, prior to the designated reaction, the fluorophores of the fluorescently labeled biomolecule are not incorporated or bonded to the biological or chemical substances (e.g., an oligonucleotides) at the reaction sites 114. To achieve the designated reaction (i.e., to incorporate a fluorescently labeled biomolecule with the biological or chemical substances of the reaction sites 114), the flow cell 1303 may provide a flow of the reaction solution into the flow channel 1390, and thereby to the reaction structure 20. The reaction solution may be any solution. In some examples, the reaction solution may include a liquid. For example, the reaction solution may be an aqueous solution. In one implementation, the reaction solution contains one or more nucleotide types, at least some of which are fluorescently-labeled, and the reaction solution also contains one or more biomolecules, such as polymerase enzymes, which incorporate nucleotides into a growing oligonucleotide at the reaction site, thereby labeling the oligonucleotide with a fluorescently-labeled nucleotide. In this implementation, a flow cell 1302 may provide a wash solution to remove any free nucleotides that did not incorporate into oligonucleotides. The reaction sites can then be illuminated with an excitation light, causing fluorescence in those reaction sites where a fluorescently-labeled nucleotide was incorporated. Reaction sites that did not incorporate a fluorescently-labeled nucleotide do not emit light upon incident excitation light.

As illustrated in FIGS. 20 and 21, because the lid 1390 is coupled (directly or indirectly) to the area of the support frame 1334 and/or the support material 1360 associated with each cavity 1340, the area of each flow channel 1390 is configured to extend entirely over the detector surface of the reaction structure 20 such that each flow channel 1390 spans across the entirety (e.g., at least 95%, or at least 99%, or 100%) of the active area 1306 of the at least one light detection device 10 of a respective cavity 1340. As the flow channels 1390 align with or extend past the active area 1306 of the at least one light detection device 10 of each respective cavity 1340 or a plurality of respective cavities 1340, the flow cell 1302 may thereby include about 100% of the active area 1306 of the at least one light detection device 10 within each respective cavity 1340 available or accessible for reagent delivery and illumination. In one example, the die size of a light detection device 10 of a respective cavity 1340 if may be about 8 mm by 9 mm, and the active area 1306 thereof may be about 7 mm by 8 mm. However, the die size and/or active area 1306 of a light detection device 10 can range for example, up to about 25 mm by 25 mm. As noted above, each flow channel 1390 can be aligned with the active area 1306 of the at least one light detection device 10 of each respective cavity 1340 or extend past the active area 1306 of the at least one light detection device 10 (and the at least one light detection device 10 itself) of each respective cavity 1340 or a plurality of cavities 1340. As such, the area of a flow channel 1390 may be larger than that of the active area 1306 of the at least one light detection device 10 of each respective cavity 1340 or a plurality of respective cavities 1340.

Figure 22:
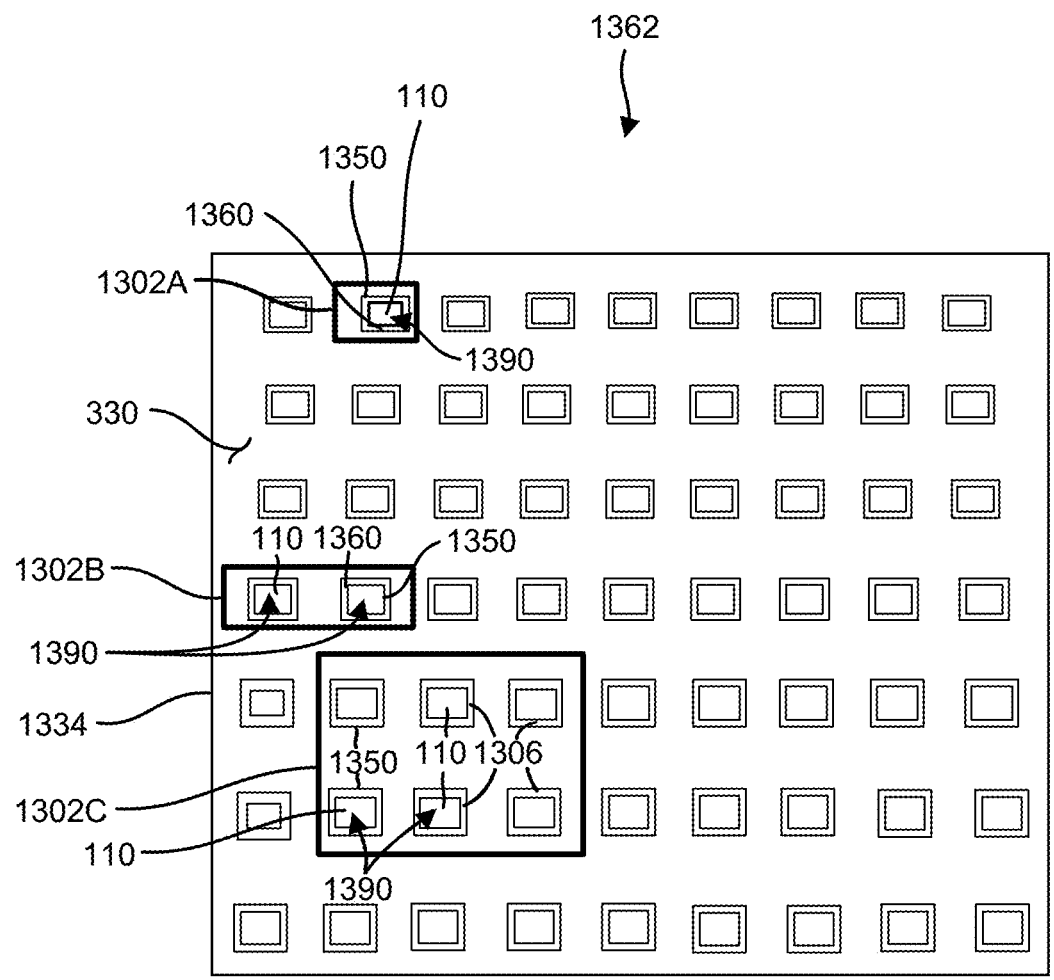
FIG. 22 illustrates, in one example, a plurality of distinct flow cells that may be formed from the plurality of flow cells of FIG. 20, in accordance with one or more aspects of the present disclosure.

A plurality of flow cells 1302 may be formed from an intermediate flow cell device disclosed herein. For example, FIGS. 20 and 22 illustrate formation of one or more discrete flow cells 1302 that may be formed from the intermediate flow cell device 1362. As shown in FIG. 20, the intermediate flow cell device 1362 may be diced at dicing lines 1304 to desperate portions of the intermediate flow cell device 1362 into one or more separate and distinct flow cells. It is noted that the intermediate flow cell device 1362 may be diced subsequent or prior to coupling the lid 1396 to the intermediate flow cell device 1362. Similarly, the intermediate flow cell device 1362 may be diced subsequent or prior to formation of the reaction structure 20 and/or reaction sites on/in the nanowells 16 thereof on the top surface of the light detection devices 10. As another example, the intermediate flow cell device 1362 may be diced subsequent or prior to formation of flow cell backside electrical contacts, such as the ball contacts 1398. As noted above, the support frame 1334 may include visual indications to aid in alignment during the dicing of the intermediate flow cell device 1362.

As shown in FIG. 22, the intermediate flow cell device 1362 may be diced to form a plurality of separate and distinct flow cells 1302A, 1302B, 1302C. It is noted that although three flow cells 1302A, 1302B, 1302C are used herein to illustrate formation of flow cells from an intermediate flow cell device, any number of flow cells may equally be formed (e.g., one flow cell, two flow cells, three flow cells, four flow cells, five flow cells, etc.). The diced flow cells 1302A, 1302B, 1302C may include the same number and/or configuration of light detection devices 10/cavities 1340, or may include a differing number and/or configuration of light detection devices 10/cavities 1340. For example, a first diced flow cell 1302A formed from the intermediate flow cell device 1362 may include a single cavity 1340 (with a flow channel 1390 positioned over the entirety (e.g., at least 95%, or at least 99%, or 100%) of the active area thereof) that includes a first number of light detection devices (e.g., one or a plurality light detection devices) of a first configuration (e.g., light detection device 10 or light detection device 110), as shown in FIG. 22. A second diced flow cell 1302B may also be formed from the intermediate flow cell device 1362 that may include a pair of cavities 1340 (with flow channels 1390 positioned over the entirety (e.g., at least 95%, or at least 99%, or 100%) of the active areas thereof) that include a second number of light detection devices (e.g., one or a plurality light detection devices) of a second configuration(s) (e.g., light detection device 10 and/or light detection device 110). The second number and/or second configuration of the light detection devices of the second diced flow cell 1302B may be the same or different than that of the first diced flow cell 1302A. As also shown in FIG. 22, a third diced flow cell 1302C may also be formed from the intermediate flow cell device 1362 that may include three or more cavities 1340 (with flow channels 1390 positioned over the entirety (e.g., at least 95%, or at least 99%, or 100%) of the active areas thereof) that include a third number of light detection devices (e.g., one or a plurality light detection devices) of a third configuration(s) (e.g., light detection device 10 and/or light detection device 110). The third number and/or third configuration of the light detection devices of the third diced flow cell 1302C may be the same or different than that of the first diced flow cell 1302A and the second diced flow cell 1302B. In this way, the sensing throughput of a distinct flow cell 1302A, 1302B, 1302C formed from the intermediate flow cell device 1362 may be determined or configured by the number and/or configuration of the cavities 1340 (and thus the number and/or configuration of the at least one light detection device 10 thereof) that is/are diced from the intermediate flow cell device 1362 to form the distinct flow cell distinct flow cell 1302A, 1302B, 1302C.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as referee labels, and are not intended to impose numerical, structural or other requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function cavity of further structure. It is to be understood that not necessarily all such objects or advantages described above may be achieved in accordance with any particular example. Thus, for example, those skilled in the art will recognize that the devices, systems and methods described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some disclosure are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A flow cell, comprising:
a support frame comprising a top side, a back side and at least one cavity extending from the top side toward the bottom side, wherein the support frame further comprises at least one electrically conductive via extending from the top side to the bottom side;
at least one light detection device disposed within the at least one cavity comprising an active area and a top surface, wherein the at least one light detection device comprises at least one solid-state light detection device including a base wafer portion, a plurality of light sensors, and a plurality of light guides associated with the plurality of light sensors;
a support material disposed within the at least one cavity between the support frame and the periphery of the at least one light detection device coupling the support frame and the at least one light detection device together; and
a lid extending over the at least one light detection device and coupled to the top side of the support frame about the periphery of the at least one light detection device, wherein the lid and at least the top surface of the at least one light detection device form a flow channel therebetween.

2. The flow cell of claim 1, wherein the at least one solid-state light detection device further includes device circuitry electrically coupled to the light sensors to transmit data signals based on photons detected by the light sensors.

3. The flow cell of claim 2, wherein the device circuitry of the at least one solid-state light detection device is electrically coupled to the at least one electrically conductive via at the top side of the support frame.

4. The flow cell of claim 1, wherein the lid is indirectly coupled to the top side of the support frame.

5. The flow cell of claim 1, wherein the at least one cavity comprises a cavity with a plurality of light detection devices disposed therein.

6. The flow cell of claim 5, wherein the plurality of light detection devices comprises distinct light detection devices that are spaced from each other, and wherein the support material further extends between adjacent light detection devices.

7. The flow cell of claim 5, wherein the plurality of light detection devices comprises at least two integral light detection devices, and wherein the support material extends between the support frame and the periphery of the at least two integral light detection devices.

8. The flow cell of claim 1, wherein the at least one light detection device comprises a plurality of light detection devices.

9. The flow cell of claim 8, wherein the at least one cavity comprises a plurality of cavities, and wherein each light detection device of the plurality of light detection devices is disposed in a differing cavity of the support frame.

10. The flow cell of claim 1, wherein the at least one cavity extends through the support frame from the top side to the bottom side, wherein the device circuitry comprises vias extending through the base wafer portion, and wherein the flow cell further comprises electrical contacts that are at least partially disposed along the back side of the support frame and electrically coupled to the vias.

11. The flow cell of claim 1, wherein the at least one light detection device further comprises a reaction structure disposed over the plurality of light guides that forms the top surface thereof, and wherein the reaction structure comprises a plurality of nanowells positioned within the active area.

12. The flow cell of claim 1, wherein the at least one cavity extends only partially through the support frame from the top side toward the bottom side.

13. The flow cell of claim 1, wherein the at least one light detection device comprises at least one complementary metal-oxide semiconductor (CMOS) light sensor.

14. The flow cell of claim 1, wherein the flow channel extends over the entirety of the active area of the at least one light detection device.

15. A method, comprising:
attaching a top surface of a support frame and a planar support surface of a substrate, the support frame comprising at least one cavity extending from the top side to a bottom side thereof;
positioning at least one light detection device within the at least one cavity such that a top side thereof is positioned on the planar support surface of the substrate and an edge portion of the cavity extends between the support frame and the periphery of the at least one light detection device, the at least one light detection device comprising an active area and a top surface;
filling the edge portion of the cavity with a support material to couple the support frame and the at least one light detection device together;
detaching the support frame and the substrate; and
attaching a lid to the top side of the support frame about the periphery of the at least one light detection device to form a flow cell, the lid extending over the at least one light detection device and forming a flow channel between the lid and at least the top surface of the at least one light detection device.

16. The method of claim 15, wherein the at least one light detection device comprises at least one solid-state light detection device including a base wafer portion forming a back side, a plurality of light sensors, device circuitry electrically coupled to the light sensors coupled to transmit data signals based on photons detected by the light sensors, and a plurality of light guides associated with the plurality of light sensors, wherein the support frame further comprises at least one electrically conductive via extending from the top side to the bottom side, and further comprising electrically coupling the device circuitry of the at least one solid-state light detection device to the at least one electrically conductive via at the top side of the support frame.

17. The method of claim 15, wherein the at least one light detection device comprises at least one solid-state light detection device including a base wafer portion forming a back side, a plurality of light sensors, device circuitry electrically coupled to the light sensors coupled to transmit data signals based on photons detected by the light sensors, and a plurality of light guides associated with the plurality of light sensors, wherein device circuitry comprises vias extending through the base wafer portion to the back side thereof, and further comprising electrically coupling contacts that are at least partially disposed along the back side of the support frame to the vias at the back side of the base wafer portion.

18. The method of claim 15, further comprising forming a reaction structure on the at least one light detection device prior to attaching the lid, the reaction structure forming the top surface of the at least one light detection device and comprising a plurality of nanowells positioned within the active area.

19. The method of claim 18, wherein detaching the support frame and the substrate exposes a recessed top side of the support material that extends below and between the top side of the support frame and a top portion of the at least one light detection device, wherein the reaction structure extends over the recessed top side of the support material and the top side of the top side of the support frame, and wherein the reaction structure forms a planar top surface from which the plurality of nanowells extend.

20. The method of claim 15, further comprising obtaining the at least one light detection device, and wherein obtaining the at least one light detection device comprises dicing at least one complementary metal-oxide semiconductor (CMOS) light sensor from a plurality of integral CMOS light sensors.

21. The method of claim 15, wherein the flow channel extends over the entirety of the active area of the at least one light detection device.

22. A method, comprising:
depositing a first support material on a bottom portion of at least one cavity of a support frame, the at least one cavity extending only partially through the support frame from a top side thereof toward a bottom side thereof, where a bottom portion of the support frame extends between a bottom surface of the bottom portion of the cavity and a bottom surface of the support frame;
positioning at least one light detection device within the at least one cavity and over the deposited first support material such that an edge portion of the at least one cavity extends between the support frame and the periphery of the at least one light detection device, the at least one light detection device comprising an active area and a top surface;
filling the edge portion of the cavity with a second support material; and
attaching a lid to the top side of the support frame about the periphery of the at least one light detection device to form a flow cell, the lid extending over the at least one light detection device and forming a flow channel between the lid and at least the top surface of the at least one light detection device.

23. The method of claim 22, wherein the flow channel extends over the entirety of the active area of the at least one light detection device.

24. The method of claim 22, wherein the first support material and the second support material are the same support material.

25. The method of claim 22, further comprising:
dicing the support frame.

* * * * *

UNITED STATES PATENT AND TRADEMARK OFFICE
CERTIFICATE OF CORRECTION

PATENT NO. : 10,921,233 B2  
APPLICATION NO. : 16/567224  
DATED : February 16, 2021  
INVENTOR(S) : Arnaud Rival Page 1 of 1

It is certified that error appears in the above-identified patent and that said Letters Patent is hereby corrected as shown below:

In the Claims

In Column 40, Line 36, Claim 19, before "support frame" delete "top side of the" (first occurrence)

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*